(12) United States Patent
Poovey

(10) Patent No.: US 8,180,186 B2
(45) Date of Patent: May 15, 2012

(54) OPTICAL SWITCHES AND LOGIC GATES EMPLOYING SAME

(75) Inventor: Gary Neal Poovey, Escalon, CA (US)

(73) Assignee: Galtronics Optical Ltd., Tiberias (IL)

( * ) Notice: Subject to any disclaimer, the term of this patent is extended or adjusted under 35 U.S.C. 154(b) by 353 days.

(21) Appl. No.: 12/595,764

(22) PCT Filed: Apr. 10, 2008

(86) PCT No.: PCT/IL2008/000494
§ 371 (c)(1),
(2), (4) Date: Oct. 13, 2009

(87) PCT Pub. No.: WO2008/126080
PCT Pub. Date: Oct. 23, 2008

(65) Prior Publication Data
US 2010/0053713 A1    Mar. 4, 2010

Related U.S. Application Data

(63) Continuation-in-part of application No. 11/734,747, filed on Apr. 12, 2007, now Pat. No. 7,532,786, and a continuation-in-part of application No. 11/734,750, filed on Apr. 12, 2007, now Pat. No. 7,606,450, which is a continuation-in-part of application No. 10/928,769, filed on Aug. 30, 2004, now Pat. No. 7,283,698.

(60) Provisional application No. 60/911,469, filed on Apr. 12, 2007.

(51) Int. Cl.
*G02B 6/26* (2006.01)
*G02F 3/00* (2006.01)

(52) U.S. Cl. ............... 385/15; 385/16; 385/13; 385/14; 359/108

(58) Field of Classification Search ............ 385/12, 385/14, 1, 2, 3, 15, 16, 17, 18, 24, 29, 42, 385/13, 901; 359/108
See application file for complete search history.

(56) References Cited

U.S. PATENT DOCUMENTS

| | | |
|---|---|---|
| 2,936,380 A | 5/1960 | Anderson |
| 3,680,080 A | 7/1972 | Maure |
| 3,965,388 A | 6/1976 | Brisk |
| 3,987,310 A | 10/1976 | Peltier et al. |
| 3,995,311 A | 11/1976 | Taylor |
| 4,023,887 A | 5/1977 | Speers |
| 4,053,794 A | 10/1977 | Edwards |
| 4,128,300 A | 12/1978 | Stotts et al. |

(Continued)

OTHER PUBLICATIONS

Alexei Grigoriev, et al., "Subnanosecond piezoelectric x-ray switch", Applied Physics Letters 89, 021109, 2006.

(Continued)

*Primary Examiner* — Brian Healy
(74) *Attorney, Agent, or Firm* — Edwards Wildman Palmer LLP

(57) ABSTRACT

An optical switch including a light passageway having a changeable cross-sectional area, an activation light responsive piezoelectric element associated with the light passageway, the activation light responsive piezoelectric element being operative to change its shape in response to activation light impinging thereon and a conductive element operatively associated with the piezoelectric element for enhancing activation light responsiveness thereof, the activation light responsive piezoelectric element being associated with the light passageway and being operative such that changes in the shape of the piezoelectric element cause changes in the changeable cross-sectional area of the light passageway sufficient to govern the passage of light along the light passageway. Logic gates and logic functionality employing an optical switch are also described.

11 Claims, 18 Drawing Sheets

U.S. PATENT DOCUMENTS

| | | | |
|---|---|---|---|
| 4,262,992 | A | 4/1981 | Berthold, III |
| 4,630,898 | A | 12/1986 | Jewell |
| 4,632,518 | A | 12/1986 | Jensen |
| 4,689,793 | A | 8/1987 | Liu et al. |
| 4,701,030 | A | 10/1987 | Jewell |
| 4,764,889 | A | 8/1988 | Hinton et al. |
| 4,932,739 | A | 6/1990 | Islam |
| 4,961,618 | A | 10/1990 | Jordan et al. |
| 4,978,842 | A | 12/1990 | Hinton et al. |
| 5,078,464 | A | 1/1992 | Islam |
| 5,101,456 | A | 3/1992 | Islam |
| 5,109,156 | A | 4/1992 | Evans et al. |
| 5,134,946 | A | 8/1992 | Poovey |
| 5,144,375 | A | 9/1992 | Gabriel et al. |
| 5,146,078 | A | 9/1992 | Luryi |
| 5,150,242 | A | 9/1992 | Fellows |
| 5,168,382 | A | 12/1992 | Tsujikawa |
| 5,315,422 | A | 5/1994 | Utaka et al. |
| 5,414,789 | A | 5/1995 | Tamil et al. |
| 5,425,115 | A | 6/1995 | Wagner |
| 5,583,636 | A * | 12/1996 | Bulow .................. 359/245 |
| 5,703,975 | A | 12/1997 | Miller et al. |
| 5,943,453 | A | 8/1999 | Hodgson |
| 5,999,284 | A | 12/1999 | Roberts |
| 6,005,791 | A | 12/1999 | Gudesen et al. |
| 6,075,512 | A | 6/2000 | Patel et al. |
| 6,128,110 | A * | 10/2000 | Bulow .................. 359/108 |
| 6,151,428 | A | 11/2000 | Vahala et al. |
| 6,178,033 | B1 | 1/2001 | Ford et al. |
| 6,320,994 | B1 | 11/2001 | Donald et al. |
| 6,385,363 | B1 | 5/2002 | Rajic et al. |
| 6,487,333 | B2 | 11/2002 | Fouquet et al. |
| 6,594,411 | B2 | 7/2003 | Chung |
| 6,609,840 | B2 | 8/2003 | Chow et al. |
| 6,697,548 | B2 | 2/2004 | LoCascio et al. |
| 6,757,459 | B2 | 6/2004 | Troll |
| 6,804,427 | B2 | 10/2004 | Tabata |
| 6,990,281 | B2 | 1/2006 | Shahar et al. |
| 6,999,221 | B1 | 2/2006 | Sarkisov et al. |
| 7,072,536 | B2 | 7/2006 | Poovey |
| 7,263,262 | B1 | 8/2007 | Covey |
| 7,283,695 | B2 | 10/2007 | Gaylord et al. |
| 7,283,698 | B2 | 10/2007 | Poovey |
| 7,486,848 | B2 | 2/2009 | Poovey |
| 7,532,786 | B2 | 5/2009 | Poovey |
| 7,606,450 | B2 | 10/2009 | Poovey |
| 2004/0037708 | A1 | 2/2004 | Murasato et al. |
| 2004/0091201 | A1 | 5/2004 | Divoux et al. |
| 2005/0129351 | A1 | 6/2005 | Poovey |
| 2006/0045407 | A1 | 3/2006 | Poovey |
| 2010/0053713 | A1 * | 3/2010 | Poovey .................. 359/108 |

OTHER PUBLICATIONS

A Written Opinion issued Mar. 2, 2011 in Singapore patent Application No. 200906776-0.

* cited by examiner

FIG. 14A
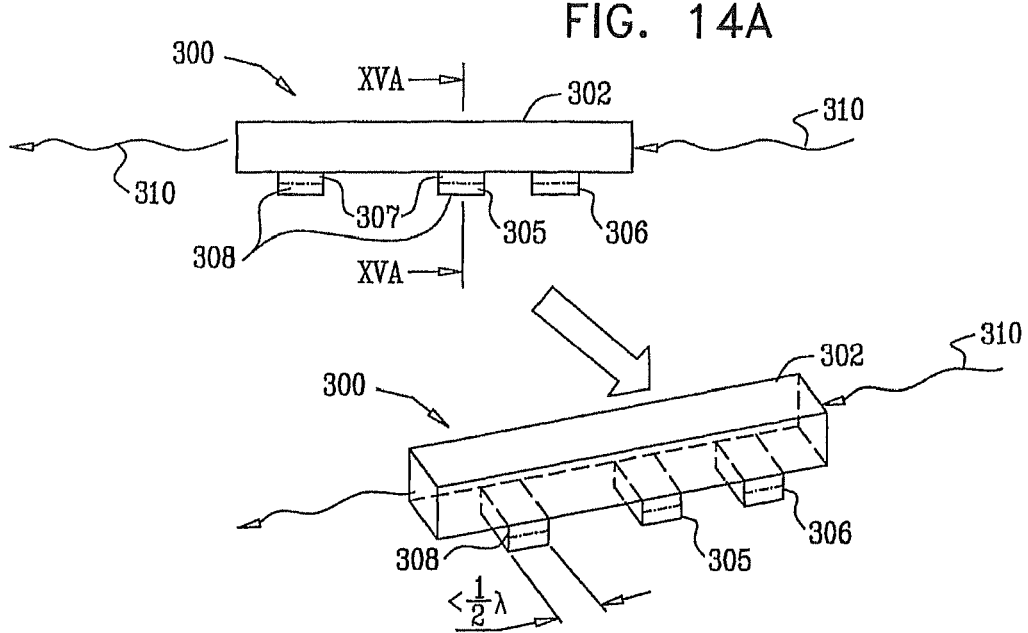
FIG. 14B
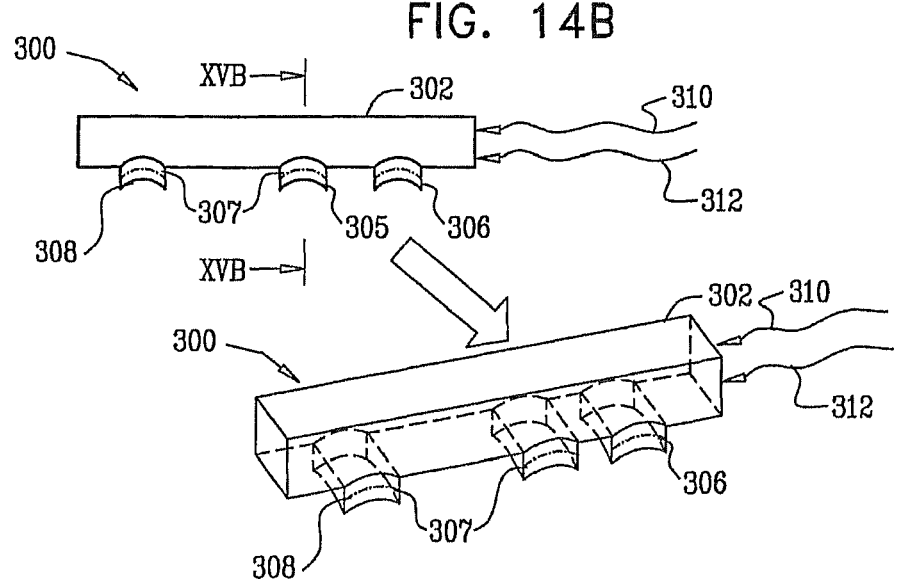
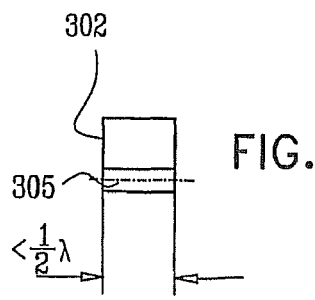
FIG. 15A
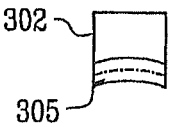
FIG. 15B

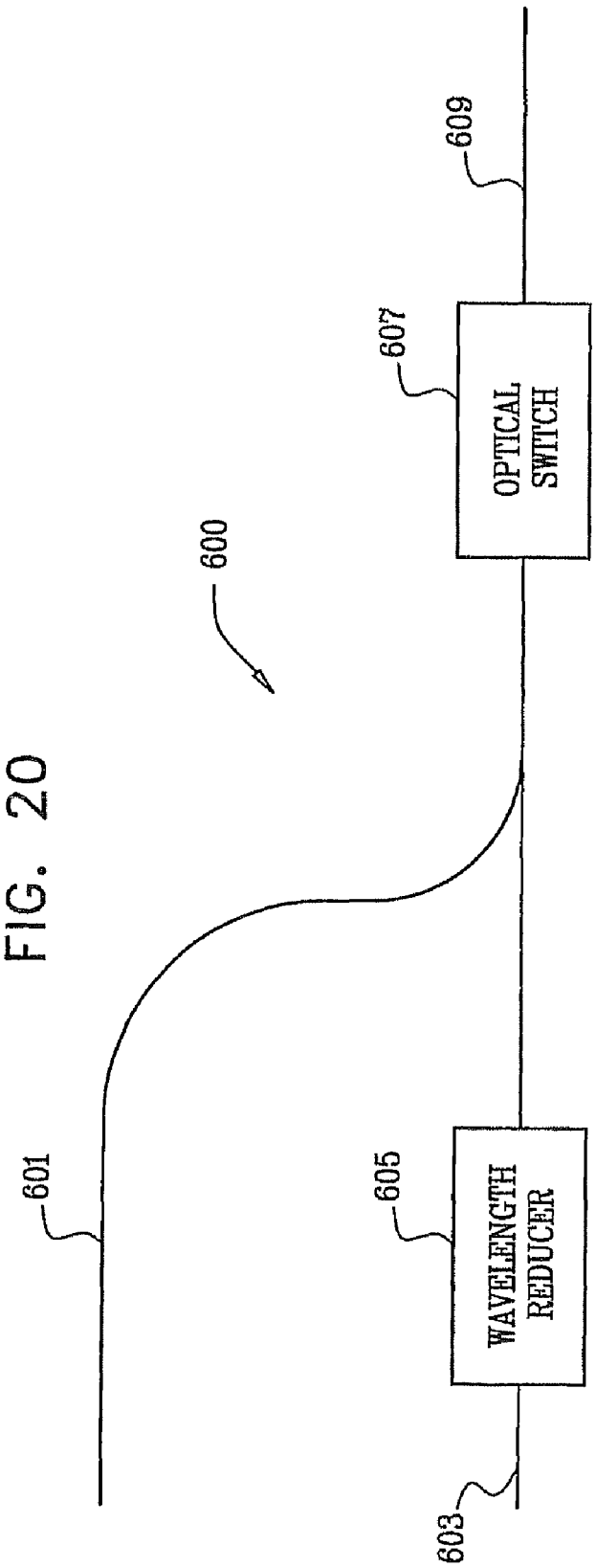

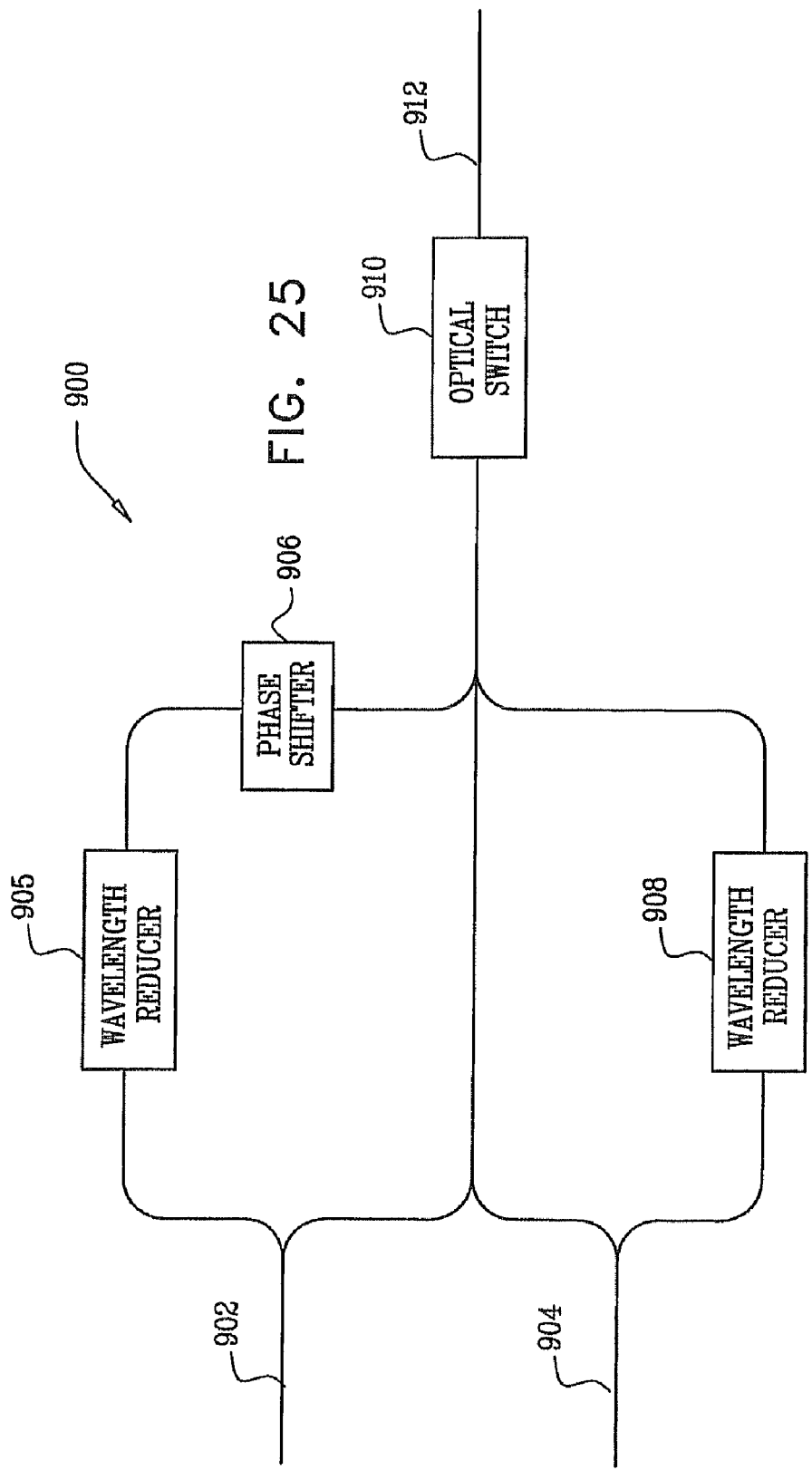

OPTICAL SWITCHES AND LOGIC GATES EMPLOYING SAME

CROSS-REFERENCE TO RELATED APPLICATIONS

This application is a national stage application under 35 U.S.C. §371 of International Application No. PCT/IL2008/000494 filed Apr. 10, 2008, which is incorporated by reference herein in its entirety, and which claims benefit of priority to each of the following applications, the disclosures of which are hereby incorporated by reference in their entireties.

U.S. patent application Ser. No. 11/734,747, filed Apr. 12, 2007 and entitled LIGHT ACTIVATED OPTICAL SWITCH THAT INCLUDES A PIEZOELECTRIC ELEMENT WITH LAYERS OF PIEZOELECTRIC MATERIAL HAVING DIFFERENT PIEZOELECTRIC CHARACTERISTICS;

U.S. patent application Ser. No. 11/734,750, filed Apr. 12, 2007 and entitled LIGHT ACTIVATED OPTICAL SWITCH THAT INCLUDES A PIEZOELECTRIC ELEMENT AND A CONDUCTIVE LAYER; and U.S. Provisional Patent Application Ser. No. 60/911,469, filed Apr. 12, 2007 and entitled LOGIC GATES FOR OPTICAL SIGNALS.

U.S. patent application Ser. No. 11/974,483, filed Oct. 15, 2007, which is a continuation of U.S. Pat. No. 7,283,698 is also incorporated by reference herein in its entirety.

FIELD OF THE INVENTION

The present invention relates to light activated switches and logic gates generally.

BACKGROUND OF THE INVENTION

The U.S. Patents of the present inventor, Dr. Gary Neal Poovey, U.S. Pat. Nos. 7,072,536 and 7,283,698, the disclosures of which are hereby incorporated by reference, together with the publications listed hereinbelow, the disclosures of which are hereby incorporated by reference, are believed to represent the current state of the art:

U.S. Pat. Nos. 6,594,411; 4,961,618; 5,414,789; 2,936,380; 3,680,080; 3,965,388; 3,995,311; 4,023,887; 4,128,300; 4,262,992; 4,689,793; 4,764,889; 4,978,842; 5,078,464; 5,109,156; 5,146,078; 5,168,382; 6,005,791; 6,609,840; 7,263,262; 3,987,310; 4,053,794; 6,757,459; 6,804,427; 6,320,994; 6,487,333; 6,178,033; 5,425,115; 6,075,512; 6,697,548; 6,594,411; 5,703,975; 6,320,994; 5,134,946; 7,283,695; 5,414,789; 4,961,618; 2,936,380; 3,680,080; 3,965,388; 3,995,311; 4,023,887; 4,128,300; 3,995,311; 4,023,887; 4,128,300; 4,262,992; 4,689,793; 4,764,889; 4,961,618; 4,978,842; 5,078,464; 5,109,156; 5,146,078; 5,168,382; 6,005,791; 6,609,840; 7,263,262; 6,151,428; 5,999,284; 5,315,422; 5,144,375; 5,101,456; 4,932,739; 4,701,030; 4,630,898; 3,987,310 and 4,053,794; and U.S. Published Patent Application Nos.: 2005/0129351; 2006/0045407; 2004/0091201 and 2004/0037708.

Alexei Grigoriev, et al., "Subnanosecond piezoelectric x-ray switch", Applied Physics Letters 89, 021109, 2006.

SUMMARY OF THE INVENTION

The present invention seeks to provide improved optical switches, logic gates and logic functionality.

There is thus provided in accordance with a preferred embodiment of the present invention an optical switch including:

a light passageway having a changeable cross-sectional area;

an activation light responsive piezoelectric element associated with the light passageway, the activation light responsive piezoelectric element being operative to change its shape in response to activation light impinging thereon; and a conductive element operatively associated with the piezoelectric element for enhancing activation light responsiveness thereof, the activation light responsive piezoelectric element being associated with the light passageway and being operative such that changes in the shape of the piezoelectric element cause changes in the changeable cross-sectional area of the light passageway sufficient to govern the passage of light along the light passageway.

Preferably, the light passageway, the piezoelectric element and the conductive element are configured and operative such that impingement of activation light within a first range of threshold levels on the piezoelectric element causes the light passageway to prevent passage of light of a first range of wavelengths therethrough and impingement of activation light within a second range of threshold levels, lying outside of the first range of threshold levels, on the piezoelectric element causes the light passageway to allow passage of light of a first range of wavelengths therethrough.

In accordance with a preferred embodiment of the present invention, the conductive element comprises a layer of a conductive material extending along a surface of the piezoelectric element.

Preferably, the piezoelectric element comprises at least two layers of piezoelectric material having different piezoelectric characteristics.

In accordance with a preferred embodiment of the present invention, the at least two layers of piezoelectric material have different crystal orientations.

Preferably, the conductive element is disposed between two layers of the piezoelectric element.

In accordance with a preferred embodiment of the present invention, there is also provided a light coupler operative to direct the activation light and signal light into the light pathway, at least one characteristic of the activation light governing whether the signal light passes through the passageway.

Additionally in accordance with a preferred embodiment of the present invention there is provided an optical switch including:

a light passageway having a changeable cross-sectional area; and an activation light responsive piezoelectric element associated with the light passageway, the activation light responsive piezoelectric element being operative to change its shape in response to activation light impinging thereon, the activation light responsive piezoelectric element including at least two layers of piezoelectric material having different piezoelectric characteristics, the piezoelectric element being associated with the light passageway and being operative such that changes in the shape of the piezoelectric element cause changes in the changeable cross-sectional area of the light passageway sufficient to govern the passage of light along the light passageway.

Preferably, the light passageway and the piezoelectric element are configured and operative such that impingement of activation light within a first range of threshold levels on the piezoelectric element causes the light passageway to prevent passage of light of a first range of wavelengths therethrough and impingement of activation light within a second range of threshold levels, lying outside of the first range of threshold levels, on the piezoelectric element causes the light passageway to allow passage of light of a first range of wavelengths therethrough.

Additionally in accordance with a preferred embodiment of the present invention there is provided a logic gate including at least one gate having at least one of NOT, AND, OR, NAND and NOR functionality including at least one optical switch actuated by light, the at least one optical switch including:

a signal light passageway having a changeable cross-sectional area; and an activation light responsive piezoelectric element associated with the light passageway, the activation light responsive piezoelectric element being operative to change its shape in response to activation light impinging thereon;

the activation light responsive piezoelectric element being associated with the light passageway and being operative such that changes in the shape of the piezoelectric element cause changes in the changeable cross-sectional area of the light sufficient to govern the passage of signal light along the light passageway.

Preferably the logic gate also includes light conduits supplying the activation light to the at least one optical switch and which carry signal light which carries digital information to and from the at least one light switch.

In accordance with a preferred embodiment of the present invention, the signal light has a wavelength which is greater than that of the activation light.

Preferably, the signal light has a wavelength which is approximately twice that of the activation light.

In accordance with a preferred embodiment of the present invention, the signal light has a wavelength of 1500 nm. and the activation light has a wavelength of approximately 750 nm.

There is additionally provided in accordance with a preferred embodiment of the present invention a logic gate providing NOT functionality and wherein the at least one optical switch comprises a single optical switch and wherein the signal light has a wavelength of approximately twice that of the activation light.

There is additionally provided in accordance with a preferred embodiment of the present invention a logic gate providing AND functionality and wherein the at least one optical switch comprises a single optical switch and wherein the signal light has a wavelength greater than that of the activation light, the logic gate also including:

first and second logic inputs receiving signal light;

a first light conduit receiving a first portion of the signal light received at the first logic input;

a second light conduit receiving a second portion of the signal light received at the first logic input;

a third light conduit receiving a first portion of the signal light received at the second logic input;

a fourth light conduit receiving a second portion of the signal light received at the second logic input;

a first wavelength modifier operative to decrease the wavelength of the light along the second light conduit to the wavelength of the activation light;

a second wavelength modifier operative to decrease the wavelength of the light along the fourth light conduit to the wavelength of the activation light;

a first phase matcher operative to match the phase of the light along the second light conduit to that the activation light;

a second phase matcher which matches the phase of the light along the fourth light conduit to the activation light; and a phase shifter operative to cause wavelength reduced and phase matched light along the second and fourth light conduits to be mutually out of phase by 180 degrees, light along the first and third light conduits being supplied as a signal light input to the optical switch; and wavelength reduced and phase matched light along the second and fourth light conduits being supplied together with additional activation light as activation light to the optical switch.

There is additionally provided in accordance with a preferred embodiment of the present invention a logic gate providing NAND functionality and wherein the first optical switch comprises a first optical switch and a second optical switch and wherein the signal light has a wavelength greater than that of the activation light, the logic gate also including:

first and second logic inputs receiving signal light inputs;

a first wavelength modifier operative to decrease the wavelength of signal light at the first input to the wavelength of the activation light;

a second wavelength modifier operative to decrease the wavelength of signal light at the second input to the wavelength of the activation light;

a third wavelength modifier operative to decrease the wavelength of signal light from the first optical switch;

a first light conduit supplying part of the light from the first wavelength modifier to a first light absorber;

a second light conduit supplying part of the light from the first wavelength modifier to the first optical switch;

a third light conduit supplying part of the light from the second wavelength modifier to a second light absorber;

a fourth light conduit supplying part of the light from the second wavelength modifier to the first optical switch;

a fifth light conduit supplying signal light from the first optical switch to the third wavelength modifier; and a sixth light conduit supplying light wavelength modified light from the third wavelength modifier to the second optical switch as activation light.

There is additionally provided in accordance with a preferred embodiment of the present invention a logic gate providing OR functionality and wherein the at least one optical switch comprises a single optical switch and wherein the signal light has a wavelength greater than that of the activation light, the logic gate also including:

first and second logic inputs receiving signal light inputs;

a first wavelength modifier operative to decrease the wavelength of the light along the first light input to the wavelength of the activation light;

a second wavelength modifier operative to decrease the wavelength of the light along the second light input to the wavelength of the activation light;

a first phase matcher operative to match the phase of wavelength modified light from the first wavelength modifier to match the phase of actuation light;

a second phase matcher operative to match the phase of the light from the second wavelength modifier to match the phase of the actuation light;

a first light conduit supplying part of the light from the first phase matcher to a first light absorber;

a second light conduit supplying part of the light from the second phase matcher to a second light absorber;

a first phase shifter;

a second phase shifter;

a third light conduit supplying part of the light from the first phase matcher to the first phase shifter, thereby to cause light from the first phase matcher to be out of phase with the activation light; and a fourth light conduit supplying part of the light from the second phase matcher to a second phase shifter, thereby to cause light from the first phase matcher to be out of phase with the supplied activation light, a fifth light conduit supplying light from the first phase shifter to the optical switch; and a sixth light conduit supplying light from the second phase shifter to the optical switch, the optical switch receiving the activation light and signal light from the fifth and sixth light conduits.

There is additionally provided in accordance with a preferred embodiment of the present invention a logic gate providing OR functionality and wherein the at least one optical switch comprises first and second optical switches and wherein the signal light has a wavelength greater than that of the activation light, the logic gate also including:

first and second logic inputs receiving signal light inputs;

a first wavelength modifier operative to decrease the wavelength of the light along the first light input to the wavelength of the activation light;

a second wavelength modifier operative to decrease the wavelength of the light along the second light input to the wavelength of the activation light;

first and second light conduits supplying wavelength modified light from the first and second wavelength modifiers;

a power limiter receiving light from the first wavelength modifier and second wavelength modifier via the respective first and second light conduits and being operative to maintain light output therefrom at a predetermined power level;

a third light conduit supplying power limited light from the power limiter to the first optical switch;

a third wavelength modifier receiving signal light from the first optical switch and being operative to decrease the wavelength of the light to the wavelength of the activation light; and a fourth light conduit supplying light from the third wavelength modifier to the second optical switch.

There is still further provided in accordance with a preferred embodiment of the present invention a logic gate providing OR functionality and wherein the at least one optical switch comprises a single optical switch and wherein the signal light has a wavelength greater than that of the activation light, the logic gate also including:

first and second logic inputs receiving signal light;

a first light conduit receiving a first portion of the signal light received at the first logic input;

a second light conduit receiving a second portion of the signal light received at the first logic input;

a third light conduit receiving a first portion of the signal light received at the second logic input;

a fourth light conduit receiving a second portion of the signal light received at the second logic input;

a first wavelength modifier operative to decrease the wavelength of the light along the second light conduit to the wavelength of the activation light;

a second wavelength modifier operative to decrease the wavelength of the light along the fourth light conduit to the wavelength of the activation light; and a phase shifter operative to cause wavelength modified light from the first wavelength modifier to be out of phase by 180 degrees with respect to the light from the second wavelength modifier, the optical switch receiving light from the first and third light conduits, the second wavelength modifier and the phase shifter.

Additionally there is provided a logic gate wherein the at least one optical switch is constructed as described hereinabove and logic functionality employing or more logic gates as described hereinabove.

Further in accordance with a preferred embodiment of the present invention there is provided an optical switch including:

a signal channel configured to guide a signal light;

a piezoelectric element adjacent to the signal channel; and a conductive layer adjacent to the piezoelectric element;

wherein passage of the signal light through the signal channel is controlled by the application of an activation light to the piezoelectric element and wherein the conductive layer enhances an electrical field applied to the piezoelectric element in response to the activation light.

Preferably, the conductive layer is adhered to a surface of the piezoelectric element.

In accordance with a preferred embodiment of the present invention, application of the activation light to the piezoelectric element causes the shape of the piezoelectric element to change such that the signal light is not able to pass through the signal channel.

Preferably, the signal channel comprises a chamber that is filled with a compressible material.

Preferably, the piezoelectric element forms a portion of the chamber.

In accordance with a preferred embodiment of the present invention, the piezoelectric element comprises at least two layers that have different piezoelectric characteristics.

Preferably, the conductive layer is adhered between two layers of the piezoelectric element.

There is additionally provided in accordance with a preferred embodiment of the present invention a method for operating an optical switch, the method including:

applying a signal light to an optical switch that comprises a piezoelectric element and at least one conductive layer adjacent to the piezoelectric element; and applying an activation light to the piezoelectric element to change the state of the optical switch;

wherein the conductive layer enhances an electrical field applied to the piezoelectric element in response to the applied activation light.

Preferably, applying the activation light to the piezoelectric element causes the shape of the piezoelectric element to change such that the signal light is not able to pass through the optical switch.

Preferably, applying the activation light comprises applying two light signals, which are out of phase with each other, to the piezoelectric element and then removing one of the light signals, leaving the remaining light signal as the activation light.

There is additionally provided a method for operating an optical switch, the method including:

applying a signal light to a signal channel, the signal channel being adjacent to a piezoelectric element that is adjacent to at least one conductive layer; and applying an activation light to the piezoelectric element to change the shape of the piezoelectric element such that the signal light is prevented from passing through the signal channel, wherein the conductive layer enhances an electrical field applied to the piezoelectric element in response to the applied activation light.

Additionally there is provided an optical switch including:

a signal channel configured to guide a signal light;

a piezoelectric element adjacent to the signal channel;

a conductive layer adjacent to the piezoelectric element; and means for applying an activation light to the piezoelectric element to change the shape of the piezoelectric element such that the signal light is prevented from passing through the signal channel;

wherein the conductive layer enhances an electrical field applied to the piezoelectric element in response to the applied activation light.

There is additionally provided a method for operating an optical switch, the method including:

applying a signal light to an optical switch that comprises a piezoelectric element, the piezoelectric element including at least two layers of piezoelectric material that have different piezoelectric characteristics; and applying an activation light to the piezoelectric element to change the state of the optical switch.

Preferably, applying the activation light to the piezoelectric element causes the shape of the piezoelectric element to change such that the signal light is not able to pass through the optical switch.

Preferably, the change in the shape of the piezoelectric element causes a change in a dimension of a signal channel of the optical switch.

In accordance with a preferred embodiment of the present invention, applying the activation light comprises applying two light signals, which are out of phase with each other, to the piezoelectric element and then removing one of the light signals, leaving the remaining light signal as the activation light.

In accordance with a preferred embodiment of the present invention, the conductive layer adjacent to the piezoelectric element enhances an electrical field applied to the piezoelectric element in response to the applied activation light.

There is also provided an optical switch including:

a signal channel configured to guide a signal light; and a piezoelectric element adjacent to the signal channel, the piezoelectric element including at least two layers of piezoelectric material that have different piezoelectric characteristics;

wherein passage of the signal light through the signal channel is controlled by the application of an activation light to the piezoelectric element.

Preferably, application of the activation light to the piezoelectric element causes the shape of the piezoelectric element to change such that the signal light is not able to pass through the signal channel.

There is also provided a method for operating an optical switch, the method including:

applying a signal light to a signal channel, the signal channel being adjacent to a piezoelectric element that has at least two layers of piezoelectric material that have different piezoelectric characteristics; and applying in activation light to the piezoelectric element to change the shape of the piezoelectric element such that the signal light is prevented from passing through the signal channel.

Additionally there is provided an optical switch including:

a signal channel configured to guide a signal light;

a piezoelectric element adjacent to the signal channel, the piezoelectric element including at least two different layers that have different piezoelectric characteristics; and means for applying an activation light to the piezoelectric element to change the shape of the piezoelectric element such that the signal light is prevented from passing through the signal channel.

BRIEF DESCRIPTION OF THE DRAWINGS

The present invention will be understood and appreciated more fully from the following detailed description, taken in conjunction with the drawings in which:

FIGS. 14A and 14B are simplified illustrations of an optical switch, in accordance with another preferred embodiment of the present invention;

FIGS. 15A and 15B are cross-sectional views of the signal channel and the piezoelectric element of FIGS. 14A and 14B, taken along the lines XVA-XVA in FIG. 14A and XVB-XVB in FIG. 14B;

FIG. 20 is a schematic drawing of a logical NOT gate;

FIG. 25 is a schematic drawing of a logical OR gate that uses an optical switch.

DETAILED DESCRIPTION OF THE INVENTION

Light actuated optical switches are used to construct AND, OR, and NOR logic gates. Light signals coming into the logic gates are processed so that the output of the logic gates conforms to the needed specification for each kind of gate. The light signals are all that are used to operate the logic gates, and no external battery is required using light actuated optical switches, the logic gates will have dimensions that will fit within semiconductor logic design dimensions.

Computers will be able to be made that function on light signals instead of electrical signals. Transistors of transistor based logic gates switch in 10E−9 seconds, and this limits the speed of transistor based logic gates. Light can travel three microns in 10E−14 seconds. Logic gates based on light actuated switches can be much faster than transistor based logic gates.

An optical switch includes a signal channel and a piezoelectric element that is adjacent to the signal channel. The piezoelectric element changes shape in response to an activation light and the piezoelectric element is configured relative to the signal channel such that the change in shape of the piezoelectric element causes a change in a dimension of the signal channel. For example, the change in shape of the piezoelectric element causes a dimension of the signal channel to be reduced far enough that a signal light is no longer able to pass through the signal channel. Using this phenomenon, the state of the optical switch is controlled by controlling the application of the activation light to the piezoelectric element. In an embodiment, the optical switch allows a signal light to pass through the signal channel when the activation light is not applied to the piezoelectric element and blocks the signal light from passing through the signal channel when the activation light is applied to the piezoelectric element. Because the shape of the piezoelectric element determines whether or not light passes through the signal channel, the function of the optical switch depends on the ability of the piezoelectric element to change shape.

In accordance with an embodiment of the invention, the piezoelectric element has at least two layers of piezoelectric material with each layer having different piezoelectric characteristics. The piezoelectric characteristics of the layers are selected to enhance the performance of the piezoelectric element and ultimately to enhance the performance of the optical switch. In an embodiment, the piezoelectric characteristics of the layers are selected to produce a piezoelectric element that exhibits sufficient shape change in response to an activation light to block a signal light from passing through a signal channel.

Figure 1A:
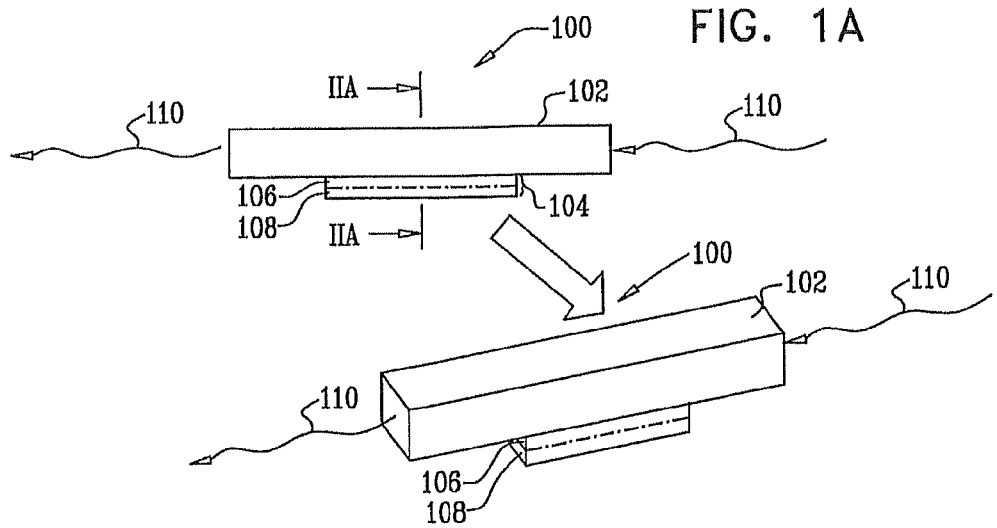
FIG. 1A depicts an optical switch that includes a signal channel and a piezoelectric element and that is controlled by an activation light.

FIG. 1A depicts an optical switch 100 that includes a signal channel 102 and a piezoelectric element 104 and that is controlled by an activation light. The signal channel guides the transmission of light within a confined area along a defined path. The signal channel is formed by a light guiding structure, or combination of structures, which can guide light within a confined area along a defined path. Structures that can form the signal channel include, for example, an optical fiber, substrates such as lithium niobate or other transparent piezoelectric materials that include a signal channel, an optical waveguide, and a chamber for holding a compressible material. In the embodiment of FIG. 1A, the signal channel is formed by a monolithic light guiding element.

The piezoelectric element 104 is formed of piezoelectric material. Examples of piezoelectric material that can be used to form the piezoelectric element include crystalline piezoelectric material such as quartz ($SiO_2$), lithium niobate ($LiNbO_3$), lead zirconate ($PbZrO_3$), lead titanate ($PbTiO_3$), and lead zirconate titanate. Examples of piezoelectric materials that can be oriented in a magnetic field are lead zirconate and lead titanate or lead zicronate titanate. Quartz and lithium niobate are examples of transparent piezoelectric materials.

The piezoelectric element 104 has at least two layers 106 and 108 of piezoelectric material having different piezoelectric characteristics. The different piezoelectric characteristics of the different layers may include, for example: 1) different degrees of expansion and/or shrinkage in response to the same electrical field; 2) different responses to the same electrical field, for example, one of the layers expands in response to an electrical field having a first orientation and the other layer expands in response to an electrical field having a second orientation that is perpendicular to the first orientation; 3) different polarities; 4) different strains; 5) different hysteresis; 6) different capacitances; 7) different impedances; 8)

different resistivities; 9) different thermal histories; and 10) different electromagnetic histories.

The piezoelectric characteristics of a piezoelectric material are a function of, for example: 1) the type of piezoelectric material; 2) the crystal orientation of the piezoelectric material; 3) doping levels within the piezoelectric material; 4) the density of the piezoelectric material; 5) the void density of the piezoelectric material; 6) the chemical constituency of the piezoelectric material; 7) the thermal history of the piezoelectric material; 8) the electromagnetic history of the piezoelectric material. The desired piezoelectric characteristic of each layer of piezoelectric material can be achieved by, for example, manipulating one or more of the above-identified parameters.

In an embodiment, layers of piezoelectric material that exhibit different degrees of expansion and/or shrinkage in response to the same electrical field are integrated into a piezoelectric element to cause the piezoelectric element to change shape or bend in response to the activation light. For example, if two adjacent layers of a piezoelectric element, which are adhered to each other into a monolithic element, expand different amounts in response to the same activation light, the piezoelectric element will bend. In an embodiment, the piezoelectric element includes at least two layers of piezoelectric material, having different piezoelectric characteristics, which are formed as a monolithic element. For example, the piezoelectric element is formed by building layers of piezoelectric material on top of each other using semiconductor processing techniques, e.g., crystal growth, deposition, sputtering, ion implantation, etc. In an embodiment, the layers of the piezoelectric element have different crystal orientations so that the two layers respond differently to the same electrical field. For example, the two layers have crystal orientations that are perpendicular to each other. In another embodiment, at least one of the layers of the piezoelectric element is made of an organic material.

Using a piezoelectric element with layers of piezoelectric material having different piezoelectric characteristics, the response of the piezoelectric element can be selected to optimize on/off switching. For example, the piezoelectric characteristics of the layers can be selected to: 1) maximize the shape change of the piezoelectric element in response to the activation light; 2) minimize hysteresis; 3) reduce the amount of power required to change the shape of the piezoelectric element; and 4) reduce the amount of heat generated by the switching technique.

Operation of the optical switch 100 depicted in FIG. 1A is now described with reference to FIGS. 1A and 1B. FIG. 1A illustrates the piezoelectric element 104 in a non-activated state. In the non-activated state, the shape of the piezoelectric element is unchanged from its normal state, where the normal state of the piezoelectric element is the state of the element in the absence of an activation light. In the embodiment of FIG. 1A, the piezoelectric element is basically flat in the non-activated state. The flat shape of the piezoelectric element allows a signal light 110 to pass through the signal channel 104 as indicated by the signal light entering and exiting the signal channel.

Figure 1B:
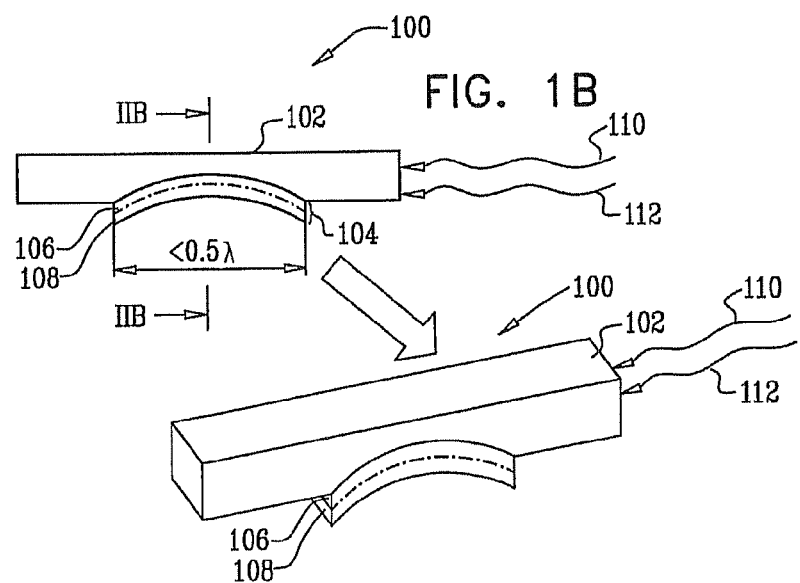
FIG. 1B illustrates the piezoelectric element from FIG. 1A in an activated state that results from the application of an activation light to the piezoelectric element.

FIG. 1B illustrates the piezoelectric element 104 in an activated state that results from the application of an activation light 112 to the piezoelectric element. In the embodiment of FIG. 1B, the activation light is applied to the piezoelectric element by directing the activation light into the signal channel 102 in parallel with the signal light 110. The activation light supplies an electrical field that effects the piezoelectric material. In the activated state, the shape of the piezoelectric element changes shape enough that the signal light is blocked from passing through the signal channel. The blocking of the signal light is indicated by the lack of the signal light exiting the signal channel. Once the activation light is removed from the signal channel, the piezoelectric element returns to its normal shape and the signal light is able once again to pass through the signal channel.

Figure 2A:
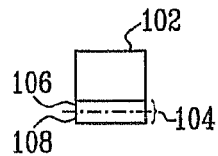
FIG. 2A is a cross-sectional view of the signal channel and the piezoelectric element of FIG. 1A when the piezoelectric element is in a non-activated state, taken along the lines IIA-IIA in FIG. 1A.
Figure 2B:
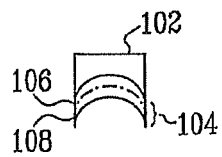
FIG. 2B is a cross-sectional view of the signal channel and the piezoelectric element from FIG. 1B when the piezoelectric element is in an activated state, taken along the lines IIB-IIB in FIG. 1B.

As described above, activation of the piezoelectric element 104 in response to the activation light 112 causes the shape of the piezoelectric element to change, thereby causing at least one dimension of the signal channel 102 to change. FIG. 2A is a cross-sectional view of the signal channel and the piezoelectric element of FIG. 1A when the piezoelectric element is in a non-activated state. FIG. 2B is a cross-sectional view of the signal channel and the piezoelectric element of FIG. 1B when the piezoelectric element is in an activated state. In the activated state, the piezoelectric element extends into the signal channel and reduces at least one dimension of the signal channel. As illustrated in FIGS. 2A and 2B, the cross-sectional area of the signal channel is smaller in the activated state (FIG. 2B) than it is in the non-activated state (FIG. 2A).

As seen in the embodiment of FIGS. 1A-2B, there is still an opening in the signal channel 102 even when the piezoelectric element 104 is in the activated state. Although there is still an opening in the signal channel even when the piezoelectric element is in the activated state, the opening in the signal channel is small enough that the signal light 110 is blocked from passing through the signal channel. The ability of a signal light to pass through the signal channel is a function of the dimensions of the signal channel and of the wavelength of the signal light. In general, light having a shorter wavelength is able to pass through a signal channel with a smaller dimension than light having a longer wavelength.

Figure 3:
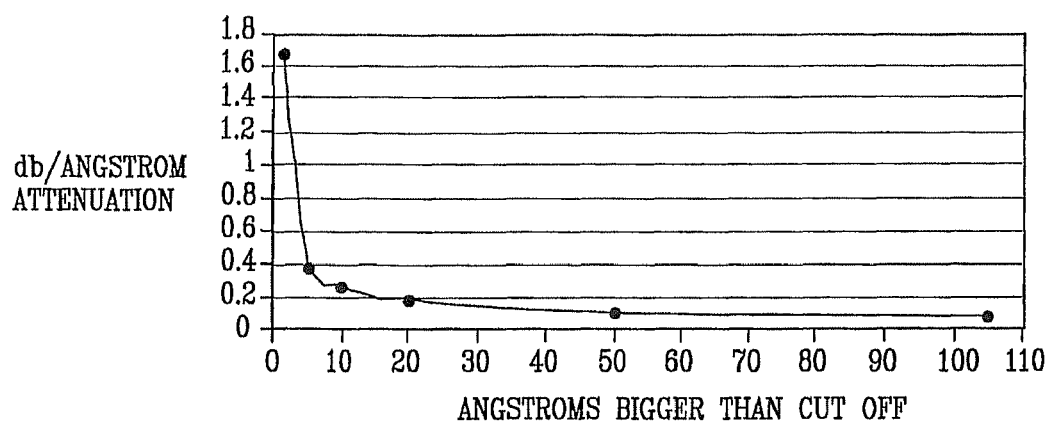
FIG. 3 depicts a graph of optical signal attenuation vs. a dimension of a signal channel.

FIG. 3 depicts a graph of optical signal attenuation vs. a dimension of a signal channel. As illustrated in FIG. 3, the optical signal attenuation changes rapidly once the signal channel dimension reaches a certain dimension, referred to herein as the cutoff dimension. For example, at a dimension smaller than the cutoff dimension (e.g., about 5 angstroms), the attenuation rapidly rises and at a dimension larger than the cutoff dimension, the attenuation rapidly falls. The sharp response to a change in the signal channel dimension around the cutoff dimension, as indicated in FIG. 3, enables fast on/off switching by toggling the activation light such that a dimension of the signal channel switches between being larger or smaller than the cutoff dimension.

As described above, the state of the optical switch 100 is activated by applying an activation light 112 to the piezoelectric element 104. Activation light can be applied to the piezoelectric element using different techniques. Some exemplary techniques for applying activation light to the piezoelectric element are described with reference to FIGS. 4A-5B.

Figure 4A:
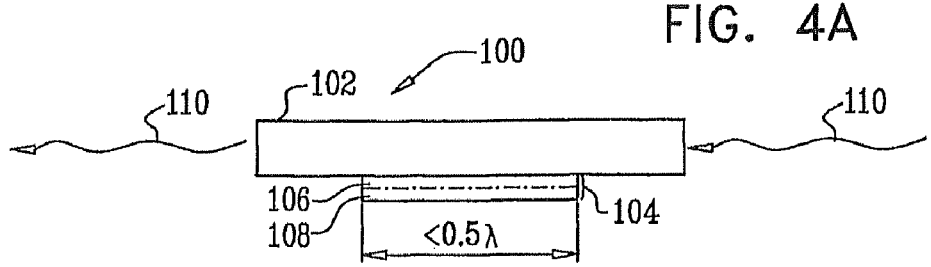
FIGS. 4A and 4B illustrate a technique for changing the state of an optical switch that involves applying an activation light having a shorter wavelength than the signal light.
Figure 4B:
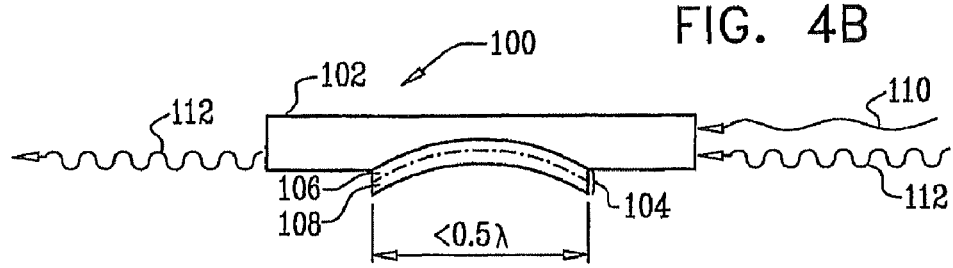

FIGS. 4A and 4B illustrate a technique for changing the state of optical switch 100 that involves applying an activation light 112 having a shorter wavelength than the signal light 110. Referring to FIG. 4A, the optical switch 100 is in an on state when no activation light is applied to the piezoelectric element 104 and the signal light 110 passes through the signal channel 102. As illustrated in FIG. 4B, activation light 112 is applied to the piezoelectric element 104 to change the state of the optical switch 100 from on to off. In the off state, the activation light 112 causes the piezoelectric element 104 to change shape and block the passage of the signal light 110 through the signal channel 102. In this example, the activation light 112 has a shorter wavelength than the signal light 110. In particular, the wavelength of the activation light 112 is short enough that the activation light 112 is still able to pass through the signal channel even when the optical switch 100 is in an off state. FIG. 4B illustrates the case in which the activation light 112, which has a shorter wavelength than the signal light 110, is able to pass through the signal channel 102 even when the optical switch 100 is in the off state.

Figure 5A:
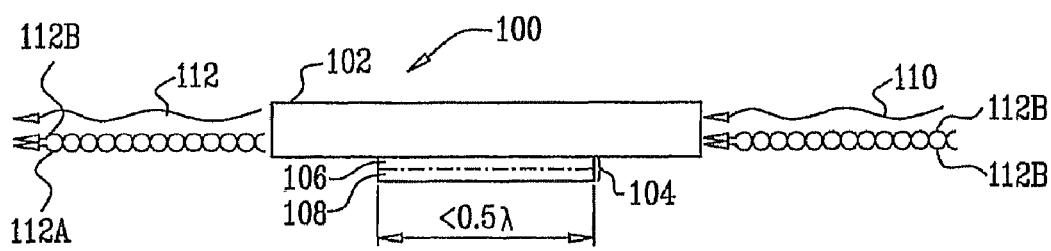
FIGS. 5A and 5B illustrate a technique for changing the state of an optical switch in which applying the activation light involves providing two light signals, which are out of phase with each other, to the piezoelectric element and then removing one of the light signals, leaving the remaining light signal as the activation light.
Figure 5B:
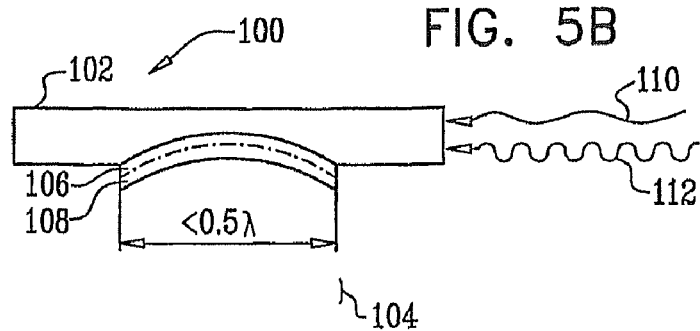

FIGS. 5A and 5B illustrate a technique for changing the state of an optical switch 100 in which applying the activation light involves providing two light signals 112A and 112B, which are out of phase with each other, to the piezoelectric element 104 and then removing one of the light signals, light signal 112A in the illustrated embodiment, leaving the remaining light signal, light signal 112B in the illustrated embodiment, as the activation light. In this embodiment, the two signals 112A and 112B are out of phase with each other such that their electrical fields effectively cancel each other out (e.g., 180 degrees out of phase). Because the two out of phase signals cancel each other out, while the two out of phase signals are simultaneously applied to the piezoelectric element 104, the piezoelectric element 104 is not activated. Once one of the light signals is removed, the electrical field of the remaining light signal is no longer canceled out and the remaining light signal activates the piezoelectric element. FIG. 5A illustrates the signal light 110 and both components of the out of phase light signals 112A and 112B passing through the signal channel 102. As described above, the piezoelectric element 104 is not activated in this case because the two out of phase light signals cancel each other out. In FIG. 5B, one of the out of phase light signals 112A is removed, leaving the remaining light signal 112B as the activation light. The activation light activates the piezoelectric element 104 and blocks the passage of the signal light 110 (and the activation light in this case) through the signal channel. In another embodiment, the power of one of the two light signals can be increased above the other light signal to overcome the canceling effect thereby providing the activation light.

Another technique for optimizing the performance of a light activated optical switch is to enhance the electrical field that is applied to the piezoelectric element in response to the activation light. In accordance with an embodiment of the invention, at least one conductive layer is located adjacent to the piezoelectric element of a light activated optical switch to enhance the electrical field that is applied to the piezoelectric element in response to the activation light. The conductive layer has free electrons or electron holes that are drawn to and collect at a surface adjacent to the piezoelectric element when the activation light is applied to the piezoelectric element. The collection of free electrons near the piezoelectric element enhances the electrical field that is applied to the piezoelectric element in response to the activation light. The enhanced electrical field can be used to enhance the performance of the piezoelectric element and ultimately to enhance the performance of the optical switch. For example, the enhanced electrical field contributed from the adjacent conductive layer enables the piezoelectric element to be activated with lower power and/or quicker than is possible when there is not a conductive layer adjacent to the piezoelectric element.

Without the conductive layer the electric field of the activation light alone activates the piezoelectric element. When a conductive layer is used, the conductive layer supplies charges that are gathered or dispersed by the electric field of the activation light. The electric field of the gathered charges adds to the electric field of the activation light. In this case, the piezoelectric element is acted upon by the electric field of the activation light and the electric field of the gathered charges. In the case of dispersed charges, matter is composed of positive and negative charges so when one is dispersed the other is expressed. In this case the electric field of the expressed charges adds to the electric field of the activation light and the effect on the piezoelectric element is enhanced. Electrons move in metal conductors, but positive holes can move in a semiconductor.

Figure 6A:
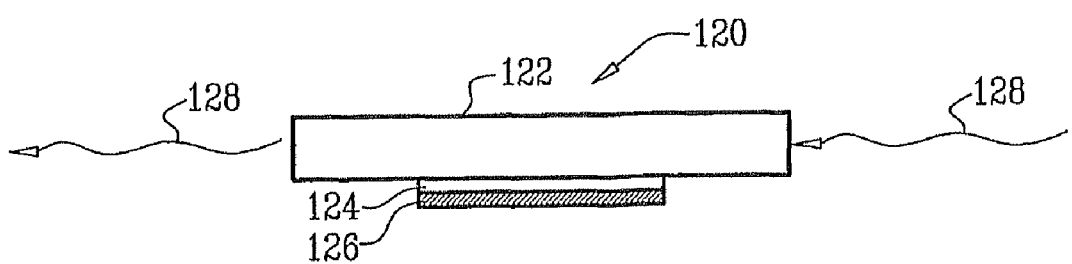
FIG. 6A depicts an embodiment of a light activated optical switch that includes a signal channel, a piezoelectric element, and a conductive layer adjacent to the piezoelectric element.

FIG. 6A depicts an embodiment of a light activated optical switch 120 that includes a signal channel 122, a piezoelectric element 124, and a conductive layer 126 adjacent to the piezoelectric element 124. The signal channel 122 and piezoelectric element 124 are similar to those described above, although the piezoelectric element 124 does not necessarily include different layers of piezoelectric material having different piezoelectric characteristics. The conductive layer 126 is a highly conductive material such as lead, tungsten, other metals, silicon doped with boron, silicon doped with arsenic, doped gallium arsenide, and/or other semiconductor materials. In an embodiment, the conductive layer 126 is adhered to a surface of the piezoelectric element 124. For example, the conductive layer 126 may be deposited on a major surface of the piezoelectric element 124 using a metal deposition technique. In an alternative embodiment, the conductive layer 126 is formed of a semiconductor material with positive or negative charges that move instead of only negative charges.

Operation of the optical switch 120 depicted in FIG. 6A is now described with reference to FIGS. 6A and 6B. FIG. 6A illustrates the piezoelectric element 124 in a non-activated state. In the non-activated state, the shape of the piezoelectric element 124 is unchanged from its normal state, where the normal state of the piezoelectric element 124 is the state of the element in the absence of an activation light. In the embodiment of FIG. 6A, the piezoelectric element 124 is basically flat in the non-activated state. The flat shape of the piezoelectric element allows a signal light 128 to pass through the signal channel 122 as indicated by the signal light 128 entering and exiting the signal channel 122.

Figure 6B:
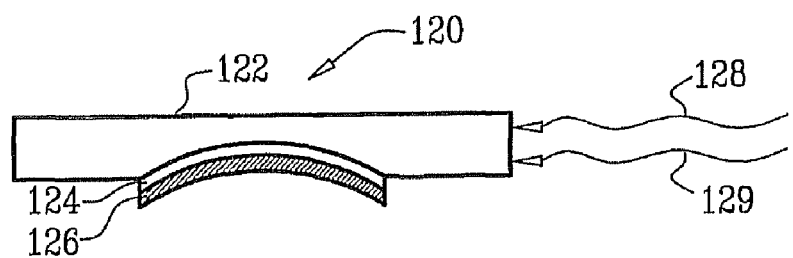
FIG. 6B illustrates the piezoelectric element of FIG. 6A in an activated state that results from the application of an activation light to the piezoelectric element.

FIG. 6B illustrates the piezoelectric element 124 in an activated state that results from the application of an activation light 129 to the piezoelectric element 124. In the embodiment of FIG. 6B, the activation light 129 is applied to the piezoelectric element 124 by directing the activation light 129 into the signal channel 122 in parallel with the signal light 128. When the activation light 129 is applied to the piezoelectric element, free electrons are drawn to the surface of the conductive layer 126 that is nearest the piezoelectric element 124. In the activated state, the shape of the piezoelectric element 124 changes shape enough that the signal light 128 is blocked from passing through the signal channel 122. The blocking of the signal light 128 is indicated by the lack of the signal light 128 exiting the signal channel 122. The additional electrons near the piezoelectric material, which are associated with the conductive layer 126, cause an increase in the electric field that is applied to the piezoelectric material of piezoelectric element 124. The increase in the electrical field that is associated with the conductive layer 126 provides benefits that include, for example, increasing the magnitude of the change in shape of the piezoelectric element 124, increasing the speed at which the piezoelectric element 124 changes shape, and/or reducing the amount of activation light required to achieve the desired shape change.

Figure 7:
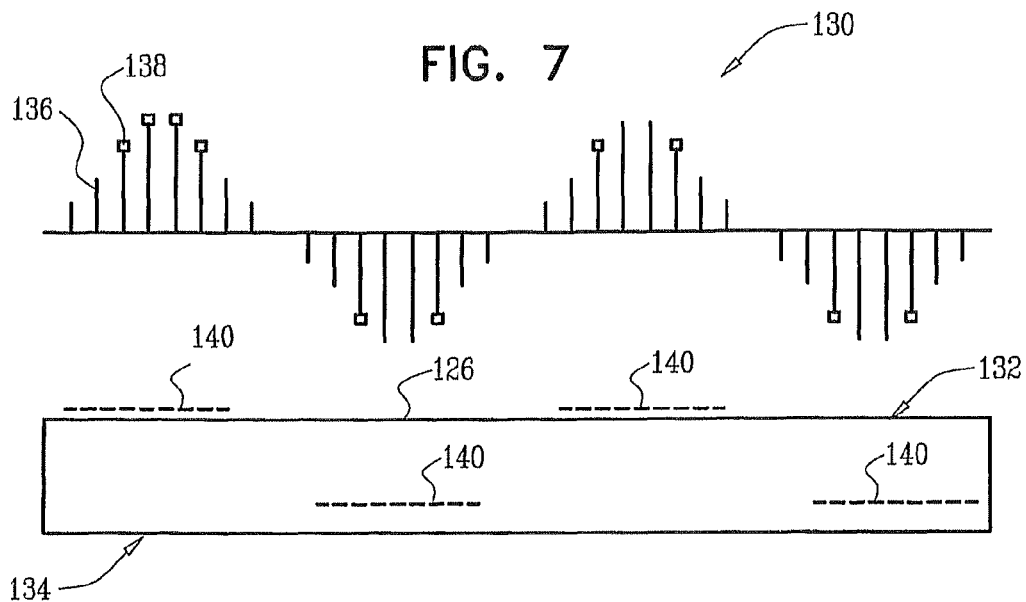
FIG. 7 illustrates the action of an electrical field of the light on the electrons of a conductive layer.

FIG. 7 illustrates the action of an electrical field 130 of the activation light 129 on the electrons of the conductive layer 126 of FIGS. 6A and 6B. In FIG. 7, surface 132 is the surface of the conductive layer 126 nearest the activation light 129 and the surface 134 is the surface of the conductive layer 126 farthest from the activation light 129. The comb-like structure in FIG. 7 represents the electrical field under the influence of the conductive layer 126. Each tooth 136 of the comb-like structure represents a portion of the electrical field and some of the teeth have wide extensions 138 at their ends. These wide extensions 138 represent the larger field that is contributed by the charges that move in the conductive layer 126 that is adjacent to the piezoelectric element 124. The charges that move in response to the electric field of the activation light 129 are represented by dashed lines 140. When the electric field is negative the charges in the conductive layer 126 are driven away from the near surface 132 of the conductive layer and enhance the negative field. When the electric field is positive the charges in the conductive layer come to the near surface 132 of the conductive layer and enhance the electric field. If the conductive layer 126 is not present, no charges would move because piezoelectric materials are not conductors but dielectric materials. Referring to FIG. 7, if the conductive layer 126 was removed leaving only a piezoelectric element (not shown), the teeth 136 on the comb like structure would have no extensions 138 on them.

Figure 8:
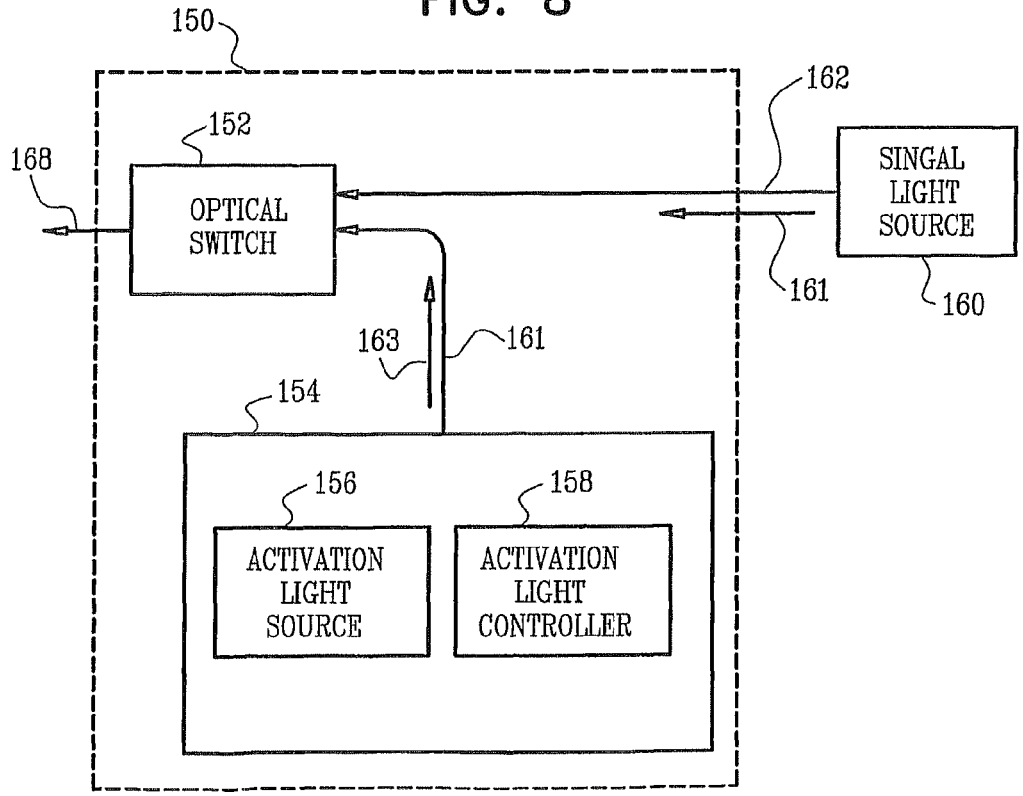
FIG. 8 depicts an optical switch system that includes a light activated optical switch as described above with reference to FIGS. 1A-7.

FIG. 8 depicts an optical switch system 150 that includes a light activated optical switch 152 as described above with reference to FIGS. 1A-7. The optical switch system 150 of FIG. 8 also includes an activation light system 154, which includes an activation light source 156 and an activation light controller 158. The optical switch system 150 is optically connected to a signal light source 160 to receive a signal light 161. In the embodiment of FIG. 8, the signal light 161 is provided to the optical switch 152 via a signal light path 162 and an activation light 163 is provided to the optical switch 152 via an activation light path 164 and the signal light path 162. The signal light 161 and activation light 163 are combined at a coupler 166. The output of the optical switch 152 goes through an output path 168.

The activation light system 154 controls the application of activation light 163 to the piezoelectric element (not shown) of the optical switch 152. In the embodiment of FIG. 8, the activation light source 156 is a light source such as a light emitting diode (LED) or a laser that generates an activation light with the desired characteristics, e.g., the desired wavelength, intensity, phase of the activation light in relation to the other light in the signal channel, and polarization, and the activation light controller 158 controls the transmission of the activation light 163 from the activation light system. In an embodiment, the intensity of the activation light 163 must be great enough to sufficiently change the shape of the piezoelectric element of the optical switch 152 and in an embodiment, the intensity of the activation light 163 is greater than the intensity of the signal light 161. The wavelength of the activation light 163 can be shorter or longer than the wavelength of the signal light 161. As described above, if the wavelength of the activation light 163 is short enough, the activation light 163 may pass through the signal channel even when the piezoelectric element is activated and the signal light 163 is blocked.

The activation light system 154 can be configured to provide the activation light 163 to the optical switch 152 in many different ways. For example, in one embodiment, the activation light 163 is switched on and off by a second light activated optical switch, in another embodiment the angle of a mirror is changed to provide the activation light 163, in another embodiment, an LED or laser is turned on/off, and in other embodiments, other switches may be employed to control the activation light 163. The signal light source 160 generates the signal light 161 that is switched on and off by the optical switch 152 (i.e., allowed to pass through the optical switch 152 and blocked from passing through the optical switch 152). In an embodiment, the signal light source 160 is an optical transmitter that transmits digital data by modulating an optical signal (e.g., frequency or amplitude modulation). In an embodiment, the signal light 161 that is output by the signal light source 160 is an optical signal that communicates digital data in some way (e.g., amplitude or frequency modulation, logic, etc.) while the activation light 163 that is output by the activation light source 156 does not communicate digital data. For example, the signal light 161 may carry digital data in a modulated light format while the activation light 163 is not modulated to carry digital data.

In operation, the signal light 161 is provided to the optical switch 152 via the signal light source 160 and the application of the activation light 163 to the piezoelectric element of the optical switch 152 is controlled by the activation light system 154. In one embodiment, the signal light 161 passes through the optical switch 152 when the activation light system 154 does not provide an activation light 163 to the optical switch 152 and is blocked from passing through the optical switch 152 when the activation light system 154 does provide an activation light 163 to the optical switch 152.

Figure 9:
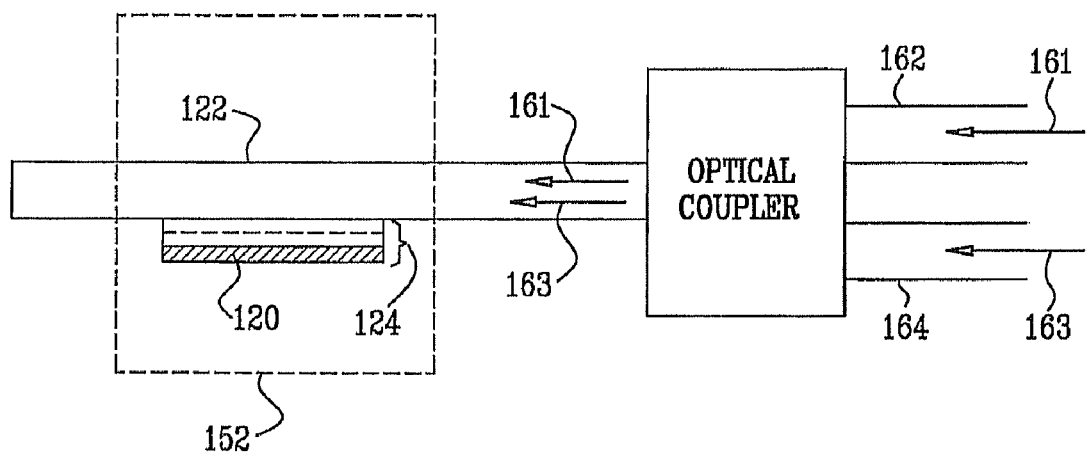
FIG. 9 depicts an embodiment of an optical switch and an optical coupler that is used to couple the signal light and the activation light into the same signal channel.

In the optical switches described with reference to FIGS. 1A-6B, the signal light and activation light are transmitted in the same signal channel. Various techniques can be used to combine the signal light and the activation light into the same signal channel. FIG. 9 depicts an embodiment of an optical switch 152 and an optical coupler 166 that is used to couple the signal light 161 and the activation light 163 into the same signal channel 122. In the embodiment of FIG. 9, the signal light 161 travels in signal light path 162, such as a signal fiber, and the activation light 163 travels in activation light path 164, such as an activation fiber. The signal light 161 and activation light 163 are coupled into the signal channel 122 by the optical coupler 166. It is appreciated that, although in the illustrated embodiment of FIG. 9 an optical coupler is shown, other suitable techniques for coupling the signal light 161 and the activation light 163 into the same signal channel 122 can be used.

Figure 10A:
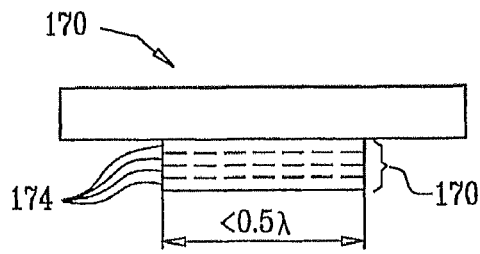
FIG. 10A depicts an embodiment of a piezoelectric element that has more than two layers of piezoelectric material with different piezoelectric characteristics.

FIGS. 10A-10E depict different embodiments of the light activated optical switches described above with reference to FIGS. 1A-9. FIG. 10A depicts an embodiment of a light activated optical switch 170 in which the piezoelectric element 172 has more than two layers 174 of piezoelectric material with different piezoelectric characteristics. In the illustrated embodiment of FIG. 10, the piezoelectric element 172 has four layers 174 of piezoelectric material. In one embodiment, the different layers 174 of piezoelectric material each have a different piezoelectric characteristic and in another embodiment, the different layers of piezoelectric material have alternating piezoelectric characteristics. It should be understood that the number and arrangement of piezoelectric layers 174 can include many different variations.

Figure 10B:
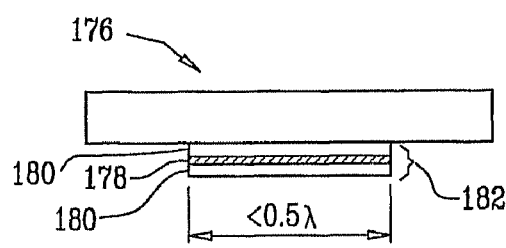
FIG. 10B depicts an embodiment of a light activated optical switch that includes a conductive layer sandwiched between two layers of a piezoelectric element.

FIG. 10B depicts an embodiment of a light activated optical switch 176 in which a conductive layer 178 is sandwiched between two layers 180 of a piezoelectric element 182. This embodiment allows the piezoelectric element 182 to be oriented by placing charges on the conductive layer 178 and causes the change in shape of each layer 180 of the piezoelectric element 182 to be enhanced because of the proximity of the piezoelectric layers 180 to the conductive layer 178.

Figure 10C:
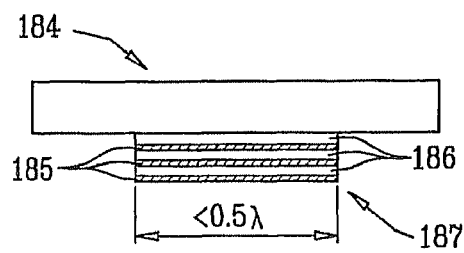
FIG. 10C depicts an embodiment of a light activated optical switch that includes multiple conductive layers sandwiched between a multilayer piezoelectric element.

FIG. 10C depicts an embodiment of a light activated optical switch 184 in which multiple conductive layers 185 are sandwiched between multiple different layers 186 of the piezoelectric element 187. In this example, the conductive layers 185 are alternately adhered between different layers 186 of the piezoelectric element 187. The multiple layers 185 of conductive material between the piezoelectric layers 186 allow each layer 186 of piezoelectric material to be polarized individually to different orientations by applying a charge to the conductive layers 185. This enables the action of the piezoelectric layers 186 working against each other to accentuate the change in shape of the piezoelectric element 187.

In general, the multiple conductive layers allow the hysteresis of the piezoelectric element to be managed. The multiple conductive layers allow a reduction in the temperature that the piezoelectric element must be raised to in order to change the orientation of the piezoelectric material. The multiple conductive layers allow the change in shape of the piezoelectric element to be enhanced. The multiple conductive layers allow the management of many mechanical, electrical, thermal, and other physical characteristics of the optical switch to be managed to make the optical switch easier to be constructed, maintained, and used. In an embodiment, the different layers of piezoelectric material and the conductive layers are formed in a monolithic stack structure. The monolithic stack structure can be formed, for example, using known semiconductor processing techniques, e.g., crystal growth, metal deposition, sputtering, ion implantation, etc.

In some cases, the hysteresis of a piezoelectric element can limit how quickly a light activated optical switch, which is made with a piezoelectric element, can be changed from one state to another. In an embodiment, a 3000 angstroms thick layer of lead zirconate titonate (PZT) is deposited on a substrate. The layer of PZT has a given percentage of lead and a given percentage of zirconium and titanium. Next, a 3000 angstrom layer of PZT is deposited on the first layer, with this layer having more lead and zirconium while reducing the percentage of titanium on top of that. Using these layers, the hysteresis that the resulting piezoelectric element displays is reduced in comparison to a piezoelectric element that does not include similar layers. If more alternating layers are deposited to build up a piezoelectric element, a quickly responding piezoelectric element can be fabricated. If all of this is deposited upon a conductive layer, the electric field of the activation light is enhanced to make a light activated optical switch that responds even faster.

Figure 10D:
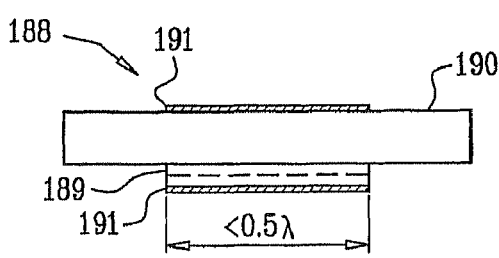
FIG. 10D depicts an embodiment of a light activated optical switch that includes a multilayer piezoelectric element and a conductive layer on two different sides of the signal channel.

FIG. 10D depicts an embodiment of a light activated optical switch 188 that includes a multilayer piezoelectric element 189 on one side of the signal channel 190 and conductive layers 191 on two sides of signal channel 190. The response of the switch is enhanced by a multiplicity of conductive layers 191.

Figure 10E:
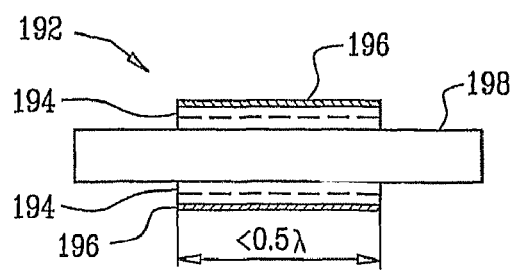
FIG. 10E depicts an embodiment of a light activated optical switch that includes a multilayer piezoelectric element and a conductive layer on each of two sides of the signal channel.

FIG. 10E depicts an embodiment of a light activated optical switch 192 that includes a multilayer piezoelectric element 194 and a conductive layer 196 on two sides of a signal channel 198. In an embodiment, FIG. 10E represents a cross-sectional view of an optical fiber that includes a piezoelectric element and a conductive layer formed in a band entirely around the circumference of the optical fiber. In this embodiment, the fiber is a compressible material.

Figure 11A:
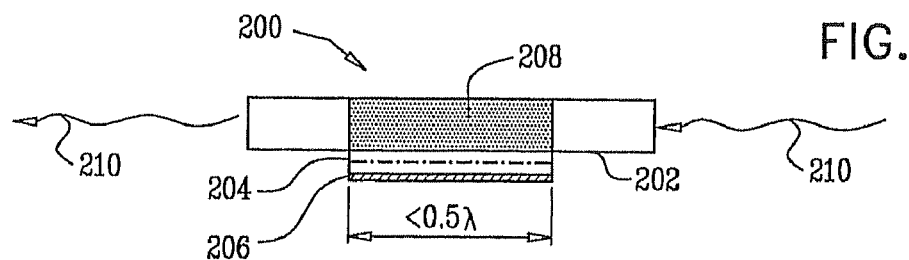
FIG. 11A depicts an embodiment of a light activated optical switch that includes a signal channel and a piezoelectric element, where a portion of the signal channel includes a chamber that is filled with a compressible material.

FIG. 11A depicts an embodiment of a light activated optical switch 200 that includes a signal channel 202, a piezoelectric element 204, and a conductive layer 206, where a portion of the signal channel includes a chamber 208 that is filled with a compressible material. The compressible material may be, for example, a gas such as argon or nitrogen or a material such as a petroleum distillate or a silicon rubber. The chamber 208 filled with the compressible material is adjacent to the piezoelectric element 204 such that the piezoelectric element 204 can expand into the chamber 208 when activated by an activation light. In an embodiment, the piezoelectric element 204 forms a portion of the chamber 208. In an embodiment, at least a portion of the chamber 204 is formed by a transparent material.

Operation of the optical switch 200 depicted in FIG. 11A is now described with reference to FIGS. 11A and 11B. FIG. 11A illustrates the piezoelectric element 204 in a non-activated state. In the non-activated state, the shape of the piezoelectric element 204 is unchanged from its normal state, where the normal state of the piezoelectric element 204 is the state of the element in the absence of an activation light. In the embodiment of FIG. 11A, the piezoelectric element 204 is basically flat in the non-activated state and does not protrude into the chamber 208. The flat shape of the piezoelectric element 204 allows a signal light 210 to pass through the signal channel 202 (including the chamber 208) as indicated by the signal light 210 entering and exiting the signal channel 202.

Figure 11B:
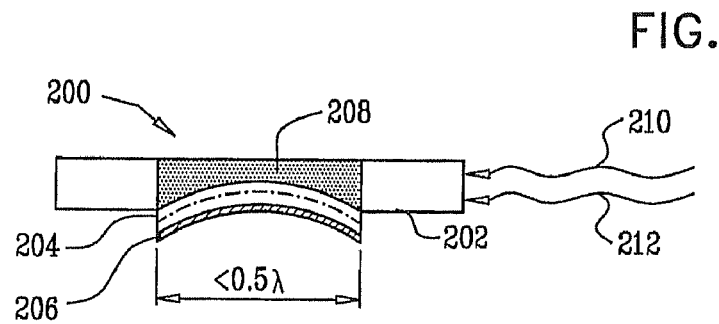
FIG. 11B illustrates the piezoelectric element from FIG. 11A in an activated state that results from the application of an activation light to the piezoelectric element.

FIG. 11B illustrates the piezoelectric element 204 in an activated state that results from the application of an activation light 212 to the piezoelectric element 204. In the embodiment of FIG. 11B, the activation light 212 is applied to the piezoelectric element 204 by directing the activation light 212 into the signal channel 202 in parallel with the signal light 210. When the activation light 212 is applied to the piezoelectric element 204, the piezoelectric element 204 protrudes into the chamber 208, thereby compressing the compressible material within the chamber. In the activated state, the shape of the piezoelectric element 204 changes enough that the signal light 210 is blocked from passing through the signal channel 202. The blocking of the signal light 210 is indicated by the lack of the signal light 210 exiting the signal channel 202. When the activation light 212 is removed from the signal channel 202, the piezoelectric element 204 returns to its normal state allowing the signal light 210 to pass. In the absence of the activation light 212, the pressure of the compressed material within the chamber 208 helps to return the piezoelectric element 204 to its normal state.

Figure 12A:
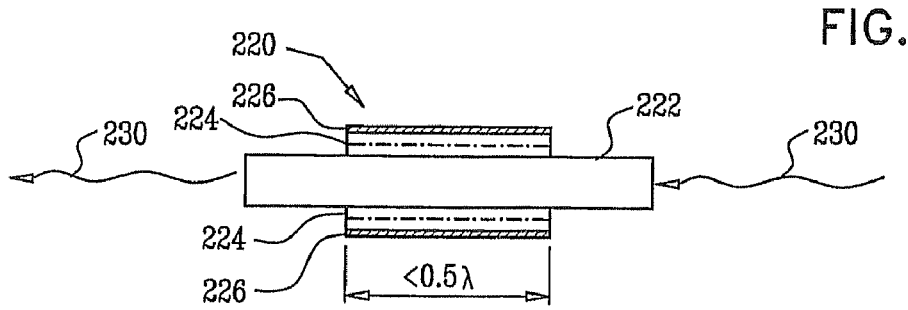
FIG. 12A depicts an embodiment of a light activated optical switch that includes a signal channel, a piezoelectric element, and a conductive layer adjacent to the piezoelectric element in which the signal channel is an optical fiber and the piezoelectric element and conductive layer are formed in a band entirely around the circumference of the optical fiber.
Figure 12B:
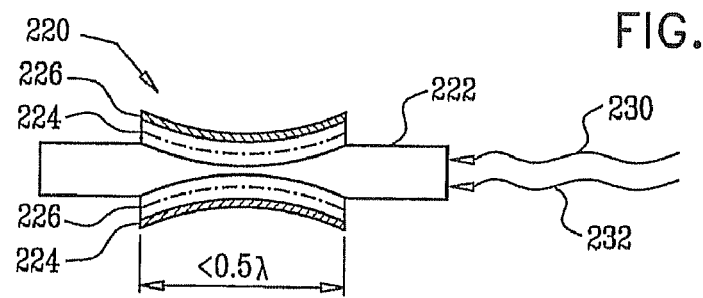
FIG. 12B illustrates the piezoelectric element from FIG. 12A in an activated state that results from the application of an activation light to the piezoelectric element.

FIG. 12A depicts an embodiment of a light activated optical switch 220 that includes a signal channel 222, a piezoelectric element 224, and a conductive layer 226 adjacent to the piezoelectric element in which the signal channel 222 is an optical fiber and the piezoelectric element 224 and conductive layer 226 are formed in a band entirely around the circumference of the optical fiber. FIG. 12A illustrates the piezoelectric element 224 in a non-activated state. In the non-activated state, the shape of the piezoelectric element 224 is unchanged from its normal state, where the normal state of the piezoelectric element 224 is the state of the element in the absence of an activation light. In the embodiment of FIG. 12A, the piezoelectric element 224 is basically flat in the non-activated state. The flat shape of the piezoelectric element 224 allows a signal light 230 to pass through the signal channel 222 as indicated by the signal light 230 entering and exiting the signal channel 222. FIG. 12B illustrates the piezoelectric element 224 in an activated state that results from the application of an activation light 232 to the piezoelectric element 224. In the embodiment of FIG. 12B, the activation light 232 is applied to the piezoelectric element 224 by directing the activation light 232 into the signal channel 222 in parallel with the signal light 230. In the activated state, the shape of the piezoelectric element 224 changes enough that the signal light 230 is blocked from passing through the signal channel 222. For example, the change in shape of the piezoelectric element 224 has the effect of squeezing the optical fiber like a belt to choke the passage of the signal light 230. The blocking of the signal light 230 is indicated by the lack of the signal light 230 exiting the signal channel 222. Once the activation light 232 is removed from the signal channel 222, the piezoelectric element 224 returns to its normal shape and the signal light 230 is able once again to pass through the signal channel 222.

Figure 13A:
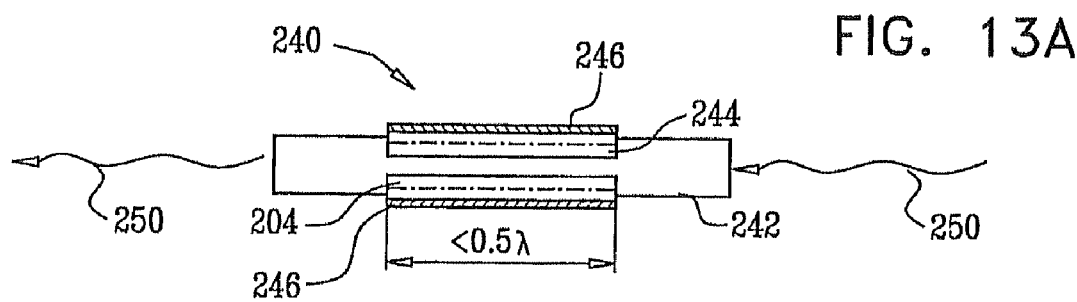
FIG. 13A depicts an embodiment of a light activated optical switch that includes a signal channel, a transparent piezoelectric element, and a conductive layer adjacent to the piezoelectric element in which the signal channel includes the transparent piezoelectric element.
Figure 13B:
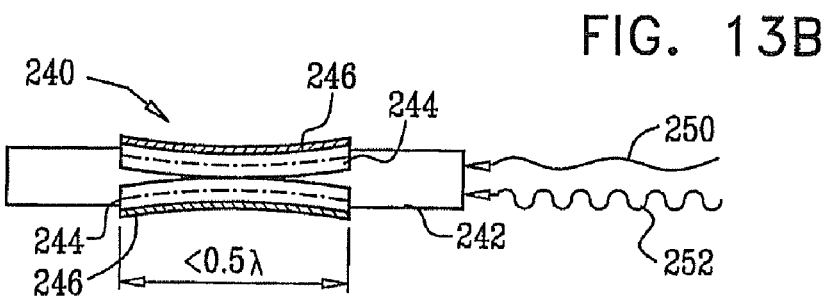
FIG. 13B illustrates the piezoelectric element from FIG. 13A in an activated state that results from the application of an activation light to the piezoelectric element.

FIG. 13A depicts an embodiment of a light activated optical switch 240 that includes a signal channel 242, a piezoelectric element 244, and a conductive layer 246 adjacent to the piezoelectric element 244 in which the piezoelectric element 244 is made of a transparent material and forms at least a portion of the signal channel 242. FIG. 13A illustrates the piezoelectric element 244 in a non-activated state. In the non-activated state, the shape of the piezoelectric element 244 is unchanged from its normal state, where the normal state of the piezoelectric element 244 is the state of the element in the absence of an activation light. In the embodiment of FIG. 13A, the piezoelectric element 244 is basically flat in the non-activated state. The flat shape of the piezoelectric element 244 allows a signal light 250 to pass through the signal channel 242 as indicated by the signal light 250 entering and exiting the signal channel 242. FIG. 13B illustrates the piezoelectric element 244 in an activated state that results from the application of an activation light 252 to the piezoelectric element. In the embodiment of FIG. 13B, the activation light 252 is applied to the piezoelectric element 244 by directing the activation light 252 into the signal channel 242 in parallel with the signal light 250. In the activated state, the shape of the piezoelectric element 244 changes enough that the signal light 250 is blocked from passing through the signal channel 242. For example, the change in shape of the piezoelectric element 244 has the effect of squeezing the signal channel 242 like a belt to choke the passage of the signal light 250. The blocking of the signal light 250 is indicated by the lack of the signal light 250 exiting the signal channel 242. Once the activation light 252 is removed from the signal channel 242, the piezoelectric element 244 returns to its normal shape and the signal light 250 is able once again to pass through the signal channel 242.

In an embodiment, the piezoelectric element and the signal channel are configured relative to each other such that application of the activation light changes the state of the optical switch from off (light is blocked) to on (light passes through the signal channel) instead of from on to off.

Some piezoelectric materials have a crystal orientation that must be aligned with the electric field that will cause it to change shape. Other piezoelectric materials can be heated up in a magnetic field and oriented to respond in the desired direction to the electric field that will be applied. In constructing a light activated optical switch, the orientation of the crystal or the magnetic orientation of the piezoelectric material should be directed to have the maximum shape change at right angles (that is perpendicular) to the direction of the signal light in the signal channel. In an embodiment, the electric field that triggers the switching is at right angles (that is perpendicular) to the path of the light in the light channel.

A description of a desired interaction follows. The electric field in volts needed to activate a light activated optical switch is calculated using the power in watts of the light in the channel. The Poynting vector equation which is written $E=(2\mu_o c P)^{1/2}$ is used to make this calculation. Where $\mu_o$ is 4 pi×10E−7 Weber/amp-meter, c is 3×10E+8 meters/second, E is the electric field in volts, and P is power in watts. Using this relation, it is found that the voltage developed by a 150-milliwatt signal in a fourth of a micron channel is 10 volts. In an embodiment, this voltage is employed to activate a light triggered optical switch to turn on or off the switch (e.g., allow the signal light to pass through the signal channel or to block the signal light from passing through the signal channel). An example of the size change that 10 volts could cause is as follows: In a channel that is 2065 angstroms in height, 10 volts will change that size by 40 angstroms when lead zicronate titonate is used. Lead zicronate titonate has a piezoelectric strain coefficient of 3.90 times 10E−10 meters/volt. 818 nm light (8180 angstroms), commonly used for fiber optics, will be able to travel in a channel just bigger than 2045 angstroms and will not travel down a channel smaller. When the 2065 angstroms channel changes to 2014 angstroms, the signal light will be blocked. Light of 8056 angstroms wavelength or shorter could still pass through the signal channel. The light activated optical switch can be turned on or off at a rate in 10E−11 seconds or faster. It makes use of effects that the electric and magnet fields of the light have on the medium through which the light travels. The equation for the attenuation (A) of the signal inside a wave-guide, which will give the decibels of attenuation per mile of travel for the signal is as follows:

$$A=(K/a^{3/2})((1/2)(f/f_o)^{3/2}+(f/f_o)^{-1/2})/((f/f_o)^2-1)^{-1/2} \qquad \text{eq. (1)}$$

The K is a constant for the material that the walls of the channel are made of; the value of K is 821.3 for lead. Since in an embodiment, only one wall of the optical switch is mostly lead, the optical switch may not follow exactly the graph of FIG. 3, but the graph is given for illustrative purposes. The lower case "a" in the equation is the length of a side of the wave-guide. The frequency (f) of the signal being considered is in ratio against the cutoff frequency ($f_o$) in the channel. This equation is for the $TE_{0,1}$ mode of wave propagation. In an embodiment, the sizes of the waveguides are chosen so that this is the only mode possible. As this relation is studied for shrinking waveguide dimensions for a given signal, the attenuation increases as the size of the signal channel shrinks and proceeds to infinity as the cutoff frequency is reached. This equation is on page 263 of Radio Engineers' Handbook written by Frederick Terman, and published by McGraw-Hill Book Company, Inc, 1943.

Reference is now made to FIG. 14A, which illustrates an optical switch 300 that includes a signal channel 302 and a plurality of piezoelectric elements which are preferably unevenly spaced along the length of the signal channel 302. In the illustrated embodiment three generally rectangular piezoelectric elements 304, 305 and 306 are distributed along the length of the signal channel 302 with non-uniform spacing therebetween. The shape of the piezoelectric elements 304, 305 and 306 is controlled by an activation light. The signal channel 302 guides the transmission of light within a confined area along a defined path. The signal channel 302 is formed by a light guiding structure, or combination of structures, which can guide light within a confined area along a defined path. Structures that can form the signal channel include, for example, an optical fiber, substrates such as lithium niobate or other transparent piezoelectric materials that include a signal channel, an optical waveguide, and a chamber for holding a compressible material. In the embodiment of FIG. 14A, the signal channel 302 is preferably formed by a monolithic light guiding element.

The piezoelectric elements 304, 305 and 306 are preferably formed of piezoelectric material. Examples of piezoelectric material that can be used to form the piezoelectric elements include crystalline piezoelectric material such as quartz ($SiO_2$), lithium niobate ($LiNbO_3$), lead zirconate ($PbZrO_3$), lead titanate ($PbTiO_3$), and lead zirconate titanate. Examples of piezoelectric materials that can be oriented in a magnetic field are lead zirconate and lead titanate or lead zicronate titantae. Quartz and lithium niobate are examples of transparent piezoelectric materials.

The piezoelectric elements 304, 305 and 306 preferably each include at least two layers 307 and 308 of piezoelectric material having different piezoelectric characteristics. The different piezoelectric characteristics of the different layers 307 and 308 may include, for example: 1) different degrees of expansion and/or shrinkage in response to the same electrical field; 2) different responses to the same electrical field, for example, one of the layers expands in response to an electrical field having a first orientation and the other layer expands in response to an electrical field having a second orientation that is perpendicular to the first orientation; 3) different polarities; 4) different strains; 5) different hysteresis; 6) different capacitances; 7) different impedances; 8) different resistivities; 9) different thermal histories; and 10) different electromagnetic histories.

Operation of the optical switch 300 depicted in FIG. 14A is now described with additional reference to FIG. 14B. FIG. 14A illustrates the piezoelectric elements 304, 305 and 306 in a non-activated state. In the non-activated state, the shape of the piezoelectric elements 304, 305 and 306 is unchanged from its normal state, where the normal state of the piezoelectric elements 304, 305 and 306 is the state of the element in the absence of an activation light. In the embodiment of FIG. 14A, the piezoelectric elements 304, 305 and 306 are basically flat in the non-activated state. The flat shape of the piezoelectric elements 304, 305 and 306 allows a signal light 310 to pass through the signal channel 302 as indicated by the signal light 310 entering and exiting the signal channel 302.

FIG. 14B illustrates the piezoelectric elements 304, 305 and 306 in an activated state that results from the application of an activation light 312 to the piezoelectric elements 304, 305 and 306. In the embodiment of FIG. 14B, the activation light 312 is applied to the piezoelectric elements 304, 305 and 306 by directing the activation light 312 into the signal channel 302 in parallel with the signal light 310. The activation light 312 supplies an electrical field that effects the piezoelectric material. In the activated state, the shape of the piezoelectric elements 304, 305 and 306 changes enough so that the signal light 310 is blocked from passing through the signal channel 302. The blocking of the signal light 310 is indicated by the lack of the signal light 310 exiting the signal channel 302. Once the activation light 312 is removed from the signal channel 302, the piezoelectric elements 304, 305 and 306 return to normal shape and the signal light 310 is able once again to pass through the signal channel 302.

As described above, activation of the piezoelectric elements 304, 305 and 306 in response to the activation light 312 causes the shape of the piezoelectric elements 304, 305 and 306 to change, thereby causing at least one dimension of the signal channel 302 to change. FIG. 15A is a cross-sectional view of the signal channel 302 and the piezoelectric element 305 of FIG. 14A when the piezoelectric element 305 is in a non-activated state. FIG. 15B is a cross-sectional view of the signal channel 302 and the piezoelectric element 305 of FIG. 14B when the piezoelectric element 305 is in an activated state. In the activated state, the piezoelectric element 305 extends into the signal channel 302 and reduces at least one dimension of the signal channel 302. As illustrated in FIGS. 15A and 15B, the cross-sectional area of the signal channel 302 is smaller in the activated state (FIG. 15B) than it is in the non-activated state (FIG. 15A).

As seen in the embodiment of FIGS. 14A-15B, there is still an opening in the signal channel 302 even when the piezoelectric elements 304, 305 and 306 are in the activated state. Although there is still an opening in the signal channel 302 even when the piezoelectric elements 304, 305 and 306 are in the activated state, the opening in the signal channel 302 is small enough that the signal light 310 is blocked from passing through the signal channel 302. The ability of a signal light 310 to pass through the signal channel 302 is a function of the dimensions of the signal channel 302 and of the wavelength of the signal light 310. In general, light having a shorter wavelength is able to pass through a signal channel 302 having a smaller dimension than light having a longer wavelength.

Figure 16A:
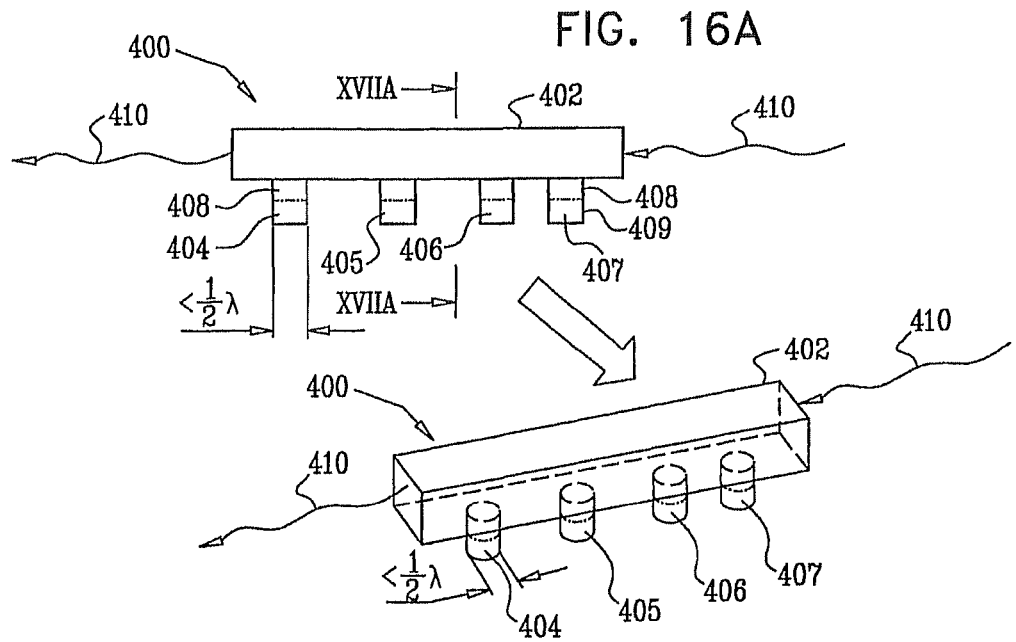
FIGS. 16A and 16B are simplified illustrations of an optical switch, in accordance with yet another preferred embodiment of the present invention.

Reference is now made to FIG. 16A which illustrates an optical switch 400 that includes a signal channel 402 and a plurality of piezoelectric elements which are preferably unevenly spaced along the length of the signal channel 402. In the illustrated embodiment, four generally circular cylindrical piezoelectric elements 404, 405, 406 and 407 are distributed along the length of the signal channel 402 with non-uniform spacing therebetween. The shape of the piezoelectric elements 404, 405, 406 and 407 is controlled by an activation light. The signal channel 402 guides the transmission of light within a confined area along a defined path. The signal channel is formed by a light guiding structure, or combination of structures, which can guide light within a confined area along a defined path. Structures that can form the signal channel include, for example, an optical fiber, substrates such as lithium niobate or other transparent piezoelectric materials that include a signal channel, an optical waveguide, and a chamber for holding a compressible material. In the embodiment of FIG. 16A, the signal channel 402 is preferably formed by a monolithic light guiding element.

The piezoelectric elements 404, 405, 406 and 407 are preferably formed of piezoelectric material. Examples of piezoelectric material that can be used to form the piezoelectric element include crystalline piezoelectric material such as quartz ($SiO_2$), lithium niobate ($LiNbO_3$), lead zirconate ($PbZrO_3$), lead titanate ($PbTiO_3$), and lead zirconate titanate. Examples of piezoelectric materials that can be oriented in a magnetic field are lead zirconate and lead titanate or lead zicronate titantae. Quartz and lithium niobate are examples of transparent piezoelectric materials.

The piezoelectric elements 404, 405, 406 and 407 preferably each include at least two layers 408 and 409 of piezoelectric material having different piezoelectric characteristics. The different piezoelectric characteristics of the different layers may include, for example: 1) different degrees of expansion and/or shrinkage in response to the same electrical field; 2) different responses to the same electrical field, for example, one of the layers expands in response to an electrical field having a first orientation and the other layer expands in response to an electrical field having a second orientation that is perpendicular to the first orientation; 3) different polarities; 4) different strains; 5) different hysteresis; 6) different capacitances; 7) different impedances; 8) different resistivities; 9) different thermal histories; and 10) different electromagnetic histories.

Figure 16B:
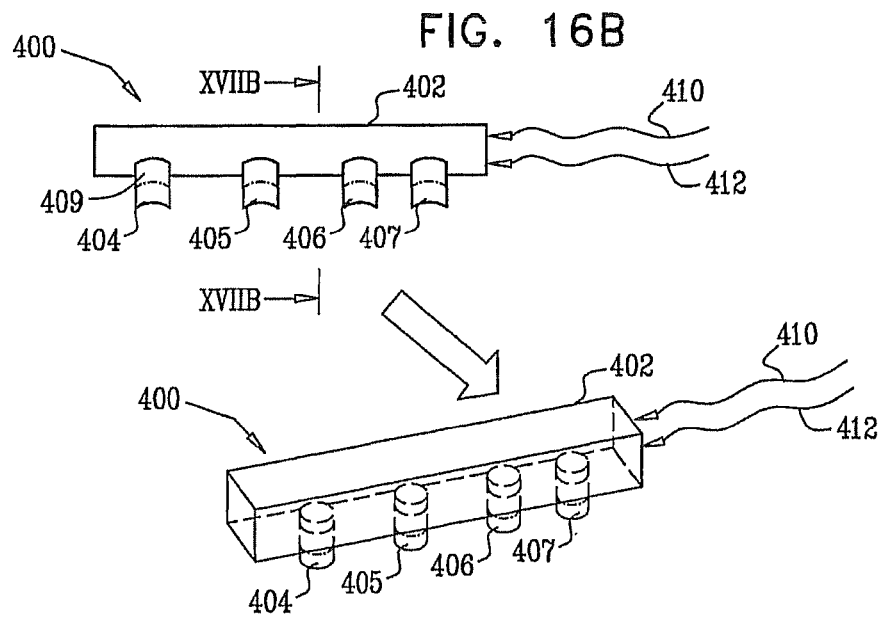

Operation of the optical switch 400 depicted in FIG. 16A is now described with additional reference to FIG. 16B. FIG. 16A illustrates the piezoelectric elements 404, 405, 406 and 407 in a non-activated state. In the non-activated state, the shape of the piezoelectric elements 404, 405, 406 and 407 is unchanged from its normal state, where the normal state of the piezoelectric elements 404, 405, 406 and 407 is the state of the element in the absence of an activation light. In the embodiment of FIG. 16A, the piezoelectric elements 404, 405, 406 and 407 are basically flat in the non-activated state. The flat shape of the piezoelectric elements 404, 405, 406 and 407 allows a signal light 410 to pass through the signal channel 402 as indicated by the signal light 410 entering and exiting the signal channel 402.

FIG. 16B illustrates the piezoelectric elements 404, 405, 406 and 407 in an activated state that results from the application of an activation light 412 to the piezoelectric elements 404, 405, 406 and 407. In the embodiment of FIG. 16B, the activation light 412 is applied to the piezoelectric elements 404, 405, 406 and 407 by directing the activation light 412 into the signal channel 402 in parallel with the signal light 410. The activation light 412 supplies an electrical field that effects the piezoelectric material. In the activated state, the shape of the piezoelectric elements 404, 405, 406 and 407 changes enough so that the signal light 410 is blocked from passing through the signal channel 402. The blocking of the signal light 410 is indicated by the lack of the signal light 410 exiting the signal channel 402. Once the activation light 412 is removed from the signal channel 402, the piezoelectric elements 404, 405, 406 and 407 return to normal shape and the signal light 410 is able once again to pass through the signal channel 402.

Figure 17A:
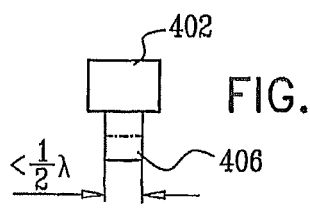
FIGS. 17A and 17B are cross-sectional views of the signal channel and the piezoelectric element of FIGS. 16A and 16B, taken along the lines XVIIA-XVIIA in FIG. 16A and XVIIB-XVIIB in FIG. 16B.
Figure 17B:
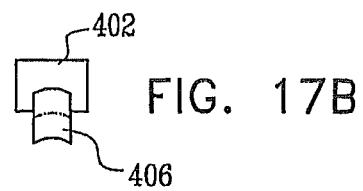

As described above, activation of the piezoelectric elements 404, 405, 406 and 407 in response to the activation light 412 causes the shape of the piezoelectric elements 404, 405, 406 and 407 to change, thereby causing at least one dimension of the signal channel 402 to change. FIG. 17A is a cross-sectional view of the signal channel 402 and the piezoelectric element 406 of FIG. 16A when the piezoelectric element 406 is in a non-activated state. FIG. 11B is a cross-sectional view of the signal channel 402 and the piezoelectric element 406 of FIG. 16B when the piezoelectric element 406 is in an activated state. In the activated state, the piezoelectric element 406 extends into the signal channel 402 and reduces at least one dimension of the signal channel 402. As illustrated in FIGS. 17A and 17B, the cross-sectional area of the signal channel 402 is smaller in the activated state (FIG. 17B) than it is in the non-activated state (FIG. 17A).

As seen in the embodiment of FIGS. 16A-17B, there is still an opening in the signal channel 402 even when the piezoelectric elements 404, 405, 406 and 407 are in the activated state. Although there is still an opening in the signal channel 402 even when the piezoelectric elements 404, 405, 406 and 407 are in the activated state, the opening in the signal channel 402 is small enough that the signal light 410 is blocked from passing through the signal channel 402. The ability of a signal light 410 to pass through the signal channel 402 is a function of the dimensions of the signal channel 402 and of the wavelength of the signal light 410. In general, light having a shorter wavelength is able to pass through a signal channel having a smaller dimension than light having a longer wavelength.

Figure 18A:
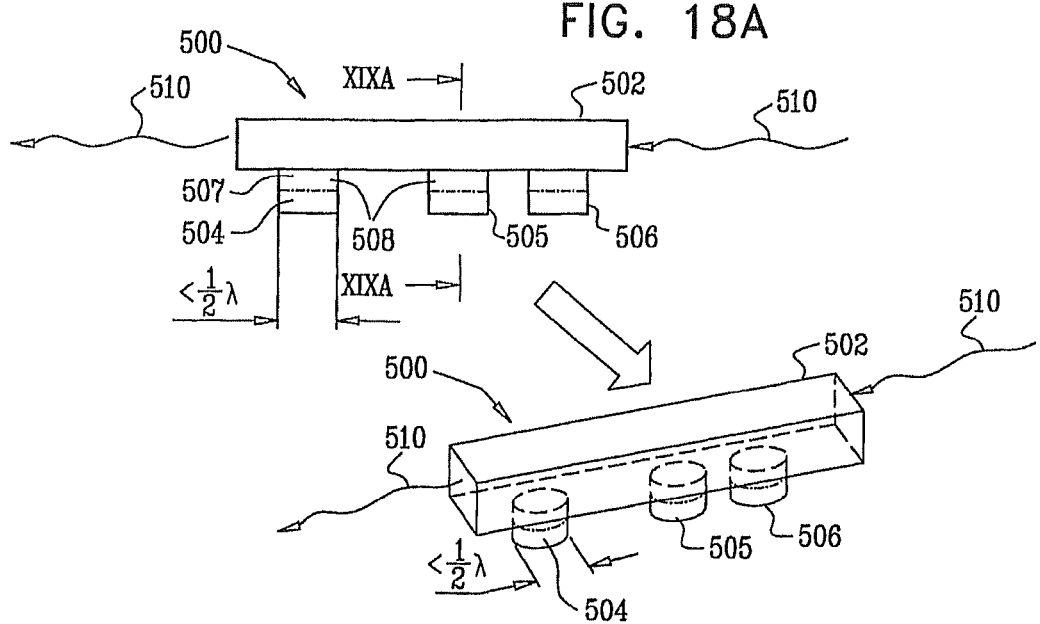
FIGS. 18A and 18B are simplified illustrations of an optical switch, in accordance with still another preferred embodiment of the present invention.

Reference is now made to FIG. 18A, which illustrates an optical switch 500 that includes a signal channel 502 and a plurality of piezoelectric element which are preferably unevenly spaced along the length of the signal channel 502. In the illustrated embodiment three generally oval cylindrical piezoelectric elements 504, 505 and 506 are distributed along the length of the signal channel 502 with non-uniform spacing therebetween. The shape of the piezoelectric elements 504, 505 and 506 is controlled by an activation light. The signal channel 502 guides the transmission of light within a confined area along a defined path. The signal channel 502 is formed by a light guiding structure, or combination of structures, which can guide light within a confined area along a defined path. Structures that can form the signal channel include, for example, an optical fiber, substrates such as lithium niobate or other transparent piezoelectric materials that include a signal channel, an optical waveguide, and a chamber for holding a compressible material. In the embodiment of FIG. 18A, the signal channel 502 is preferably formed by a monolithic light guiding element.

The piezoelectric elements 504, 505 and 506 are preferably formed of piezoelectric material. Examples of piezoelectric material that can be used to form the piezoelectric element include crystalline piezoelectric material such as quartz ($SiO_2$), lithium niobate ($LiNbO_3$), lead zirconate ($PbZrO_3$), lead titanate ($PbTiO_3$), and lead zirconate titanate. Examples of piezoelectric materials that can be oriented in a magnetic field are lead zirconate and lead titanate or lead zicronate titantae. Quartz and lithium niobate are examples of transparent piezoelectric materials.

The piezoelectric element 504, 505 and 506 preferably each include at least two layers 507 and 508 of piezoelectric material having different piezoelectric characteristics. The different piezoelectric characteristics of the different layers 507 and 508 may include, for example: 1) different degrees of expansion and/or shrinkage in response to the same electrical field; 2) different responses to the same electrical field, for example, one of the layers expands in response to an electrical field having a first orientation and the other layer expands in response to an electrical field having a second orientation that is perpendicular to the first orientation; 3) different polarities; 4) different strains; 5) different hysteresis; 6) different capacitances; 7) different impedances; 8) different resistivities; 9) different thermal histories; and 10) different electromagnetic histories.

The piezoelectric characteristics of a piezoelectric material are a function of, for example: 1) the type of piezoelectric material; 2) the crystal orientation of the piezoelectric material; 3) doping levels within the piezoelectric material; 4) the density of the piezoelectric material; 5) the void density of the piezoelectric material; 6) the chemical constituency of the piezoelectric material; 7) the thermal history of the piezoelectric material; 8) the electromagnetic history of the piezoelectric material. The desired piezoelectric characteristic of each layer of piezoelectric material can be achieved by, for example, manipulating one or more of the above-identified parameters.

Preferably, layers of piezoelectric material that exhibit different degrees of expansion and/or shrinkage in response to the same electrical field are integrated into a piezoelectric element to cause the piezoelectric element to change shape or bend in response to the activation light. For example, if two adjacent layers of a piezoelectric element, which are adhered to each other into a monolithic element, expand different amounts in response to the same activation light, the piezoelectric element will bend. In an embodiment, the piezoelectric element includes at least two layers of piezoelectric material, having different piezoelectric characteristics, which are formed as a monolithic element. For example, the piezoelectric element is formed by building layers of piezoelectric material on top of each other using semiconductor processing techniques, e.g., crystal growth, deposition, sputtering, ion implantation, etc. In an embodiment, the layers of the piezoelectric element have different crystal orientations so that the two layers respond differently to the same electrical field. For example, the two layers have crystal orientations that are perpendicular to each other. In another embodiment, at least one of the layers of the piezoelectric element is made of an organic material.

By using a piezoelectric element with layers of piezoelectric material having different piezoelectric characteristics, the response of the piezoelectric element can be selected to optimize on/off switching. For example, the piezoelectric characteristics of the layers can be selected to: 1) maximize the shape change of the piezoelectric element in response to the activation light; 2) minimize hysteresis; 3) reduce the amount of power required to change the shape of the piezoelectric element; and 4) reduce the amount of heat generated by the switching technique.

Figure 18B:
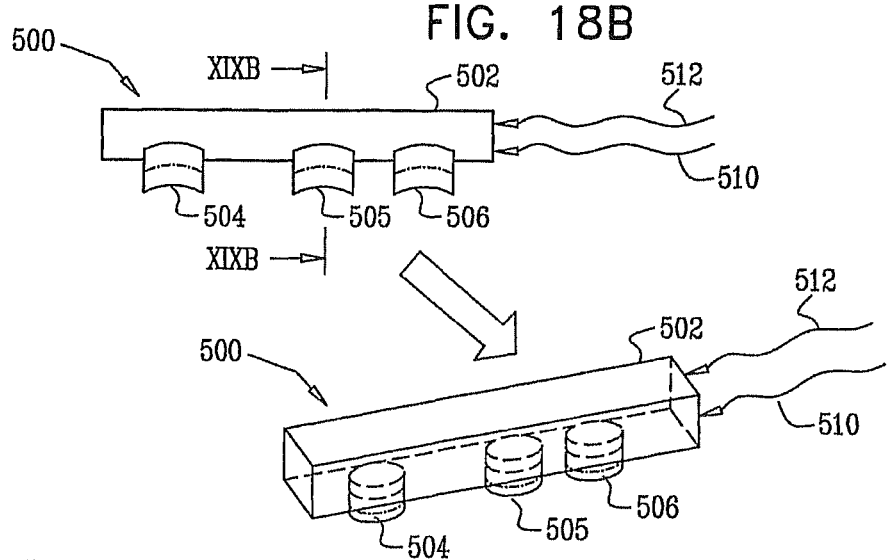

Operation of the optical switch 500 depicted in FIG. 18A is now described with additional reference to FIG. 18B. FIG. 18A illustrates the piezoelectric elements 504, 505 and 506 in a non-activated state. In the non-activated state, the shape of the piezoelectric elements 504, 505 and 506 is unchanged from its normal state, where the normal state of the piezoelectric elements 504, 505 and 506 is the state of the element in the absence of an activation light. In the embodiment of FIG. 18A, the piezoelectric elements 504, 505 and 506 are basically flat in the non-activated state. The flat shape of the piezoelectric elements 504, 505 and 506 allows a signal light 510 to pass through the signal channel 502 as indicated by the signal light 510 entering and exiting the signal channel 502.

FIG. 18B illustrates the piezoelectric elements 504, 505 and 506 in an activated state that results from the application of an activation light 512 to the piezoelectric elements 504, 505 and 506. In the embodiment of FIG. 18B, the activation light 512 is applied to the piezoelectric elements 504, 505 and 506 by directing the activation light 512 into the signal channel 502 in parallel with the signal light 510. The activation light 512 supplies an electrical field that effects the piezoelectric material. In the activated state, the shape of the piezoelectric elements 504, 505 and 506 change enough so that the signal light 510 is blocked from passing through the signal channel 502. The blocking of the signal light 510 is indicated by the lack of the signal light 510 exiting the signal channel 502. Once the activation light 512 is removed from the signal channel 502, the piezoelectric elements 504, 505 and 506 return to normal shape and the signal light 510 is able once again to pass through the signal channel 502.

Figure 19A:
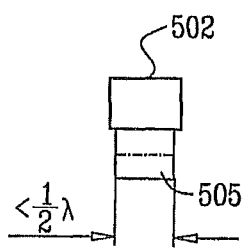
FIGS. 19A and 19B are cross-sectional views of the signal channel and the piezoelectric element of FIGS. 18A and 18B, taken along the lines XIXA-XIXA in FIG. 18A and XIXB-XIXB in FIG. 18B.
Figure 19B:
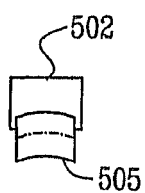

As described above, activation of the piezoelectric elements 504, 505 and 506 in response to the activation light 512 causes the shape of the piezoelectric elements 504, 505 and 506 to change, thereby causing at least one dimension of the signal channel 502 to change. FIG. 19A is a cross-sectional view of the signal channel 502 and the piezoelectric element 505 of FIG. 18A when the piezoelectric element 505 is in a non-activated state. FIG. 19B is a cross-sectional view of the signal channel 502 and the piezoelectric element 505 of FIG. 18B when the piezoelectric element 505 is in an activated state. In the activated state, the piezoelectric element 505 extends into the signal channel 502 and reduces at least one dimension of the signal channel 502. As illustrated in FIGS. 19A and 19B, the cross-sectional area of the signal channel 502 is smaller in the activated state (FIG. 19B) than it is in the non-activated state (FIG. 19A).

As seen in the embodiment of FIGS. 18A-19B, there is still an opening in the signal channel 502 even when the piezoelectric elements 504, 505 and 506 are in the activated state. Although there is still an opening in the signal channel 502 even when the piezoelectric elements 504, 505 and 506 are in the activated state, the opening in the signal channel 502 is small enough that the signal light 510 is blocked from passing through the signal channel 502. The ability of a signal light 510 to pass through the signal channel 502 is a function of the dimensions of the signal channel 502 and of the wavelength of the signal light 510. In general, light having a shorter wavelength is able to pass through a signal channel having a smaller dimension than light having a longer wavelength.

It is appreciated that all computer logic can be done with three logic gates. These are the AND, OR, and NOR logic gates. These handle digital signals in specific ways that are described using a truth table. The truth table gives the signal that will be output from the gate when specified signals are input into the gate.

TABLE 1

| INPUT A | INPUT B | AND OUTPUT |
|---------|---------|------------|
| 0 | 0 | 0 |
| 0 | 1 | 0 |
| 1 | 0 | 0 |
| 1 | 1 | 1 |

Table 1 is a truth table for the logical AND gate. The ones in the A and B input columns indicate that a digital signal pulse is entering the gate. The inputs can come in on the A input or the B input. Only when an input signal is found on both the A input and B input does an output pulse result from the AND gate.

TABLE 2

| INPUT A | INPUT B | OR OUTPUT |
|---------|---------|-----------|
| 0 | 0 | 0 |
| 0 | 1 | 1 |
| 1 | 0 | 1 |
| 1 | 1 | 1 |

Table 2 is a truth table for the logical OR gate. When an input signal is found on either the A input and B input or both an output pulse results from the OR gate.

TABLE 3

| INPUT A | INPUT B | NOR OUTPUT |
|---------|---------|------------|
| 0 | 0 | 1 |
| 0 | 1 | 0 |
| 1 | 0 | 0 |
| 1 | 1 | 0 |

Table 3 is a truth table for the logical NOR gate. Only when an input signal is not found on both the A input and B input does an output pulse result from the NOR gate. A NOR gate is often explained as an OR gate with a NOT gate on its output.

The logical NOT gate takes a signal and transforms it into its opposite. When there is a signal coming in, no signal is sent out, and when no signal is coming in, then a signal is sent out.

In present computer circuits, three transistors may be used to make a logical AND or A logical OR gate for electrical digital signals. In present computer circuits, four transistors may be used to make a logical NOR gate. Transistors switch in 10E-9 seconds. This determines how fast a computer can be made to function. Present computers function on the flow of electronic digital signals not light signals. Light signals are also called optical or photonic signals.

The present invention includes AND, OR and NOR logic gates based upon fiber optical switches that are actuated by light and not actuated by an electrical signal or transistor circuit. They require no battery, and if the correct switch is chosen, the gates can be made small enough for semiconductor size constraints. One example of a light activated optical switch is disclosed in U.S. Pat. No. 7,072,536, which incorporated by reference herein. Although one example of a light activated optical switch is identified, the logic gates can be formed using other type of light actuated optical switches.

In an embodiment of the present invention, the light that carries the digital information for the logic is a 1500 nm wavelength signal as in commonly used in present fiber optic channels. This signal can be changed into a 750 nm signal by using a Periodically Poled Lithium Niobate (PPLN) crystal that will double the frequency of the input signal. This frequency doubling makes the wavelength of the signal half of the original wavelength. The change to half of the wavelength is merely an example, as is PPLN. Other wave lengths and means could be used.

With a different configuration PPLN crystals can also produce 1500 nm wavelength light out of 750 nm light. Generally a PPLN element functions only for specific wavelengths and not for others at the same time. During these conversions, power is lost, but optical amplifiers can be used to boost the signal back up to necessary levels. For the present disclosure, the power boosting that is needed, will be included in the frequency doubling function.

Light can be in a fiber optic channel with light that is 180 degrees out of phase, and the electric field of the light will not be expressed. The light that is 180 degrees out of phase with it cancels the power of the light.

Reference is now made to FIG. 20, which is a schematic of a logical NOT gate 600 for fiber optic systems. In FIG. 20, an optical channel 601, such as an optical fiber, brings in a 1500 nm signal that is needed by the logic gate 600. An optical channel 603, such as an optical fiber, that brings in the 1500 nm signal that will be changed by the logical NOT gate 600. A wavelength reducer 605 doubles the frequency of the incoming signal so that it will be converted to a 750 nm signal, and it has incorporated in it any optical amplification function needed to prepare the signal to be useful after the frequency conversion is accomplished. Optical channel 601 joins with the output of wavelength reducer 605 and enters optical switch 607. Optical switch 607 is a light activated optical switch as described above. Optical switch 607 will allow the 1500 nm signal to be output until a 750 nm signal comes from the wavelength reducer 605. When a 750 nm signal comes from wavelength reducer 605, no signal is output from optical switch 607. Optical channel 609 provides the output signal from the logical NOT gate 600. An output signal is only provided when no signal is input on optical channel 603, thus providing a logical NOT gate.

Figure 21:
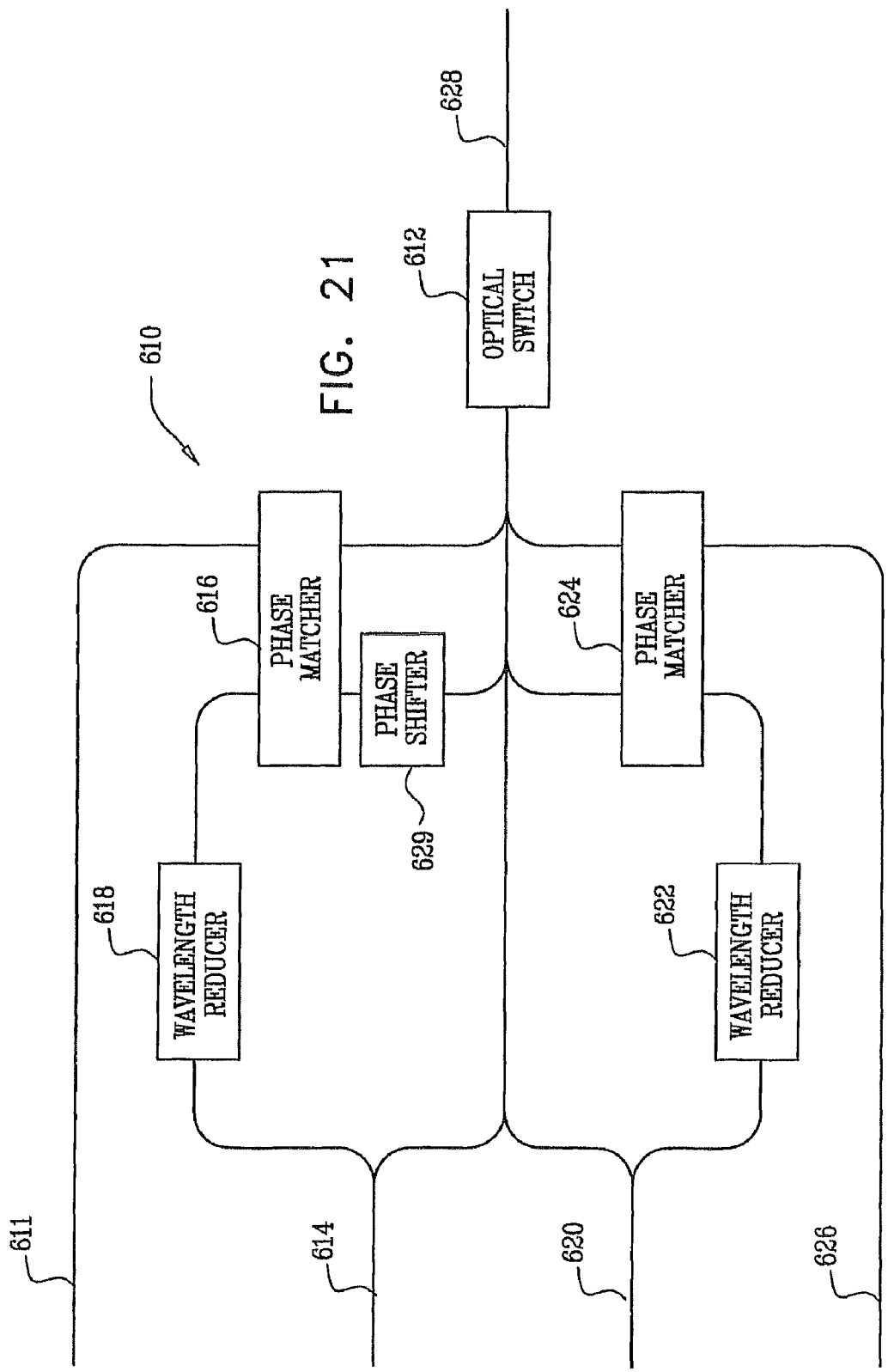
FIG. 21 is a schematic drawing of a logical AND gate that uses an optical switch.

Reference is now made to FIG. 21, which is a schematic of a logical AND gate 610. An optical channel 611, such as an optical fiber, supplies a higher frequency wave length signal to an optical switch 612 to actuate switch 612. Optical channel 611 joins with the other fiber optic channels to enter optical switch 612 after the phase of the light in optical channel 611 is matched to the light entering a first logical input provided to the logical AND gate 610 along an optical channel 614, by phase matcher 616. Optical channel 614 divides, with half of the light going into a wavelength reducer 618, then to phase matcher 616 and then joins with other optical channels to provide inputs to the optical switch 612. The other half of the light in optical channel 614 is input directly into optical switch 612.

A second logical input is provided to the logical AND gate 610 along an optical channel 620. Optical channel 620 divides, with half of the light going into a wavelength reducer 622, then to phase matcher 624 and then joins with other optical channels to provide inputs to the optical switch 612. The other half of the light in optical channel 614 is input directly into optical switch 612.

An optical channel 626 joins with the other fiber optic channels to provide inputs to optical switch 612 after the phase of the light in optical channel 626 is matched to the light of second logical input on optical channel 620 by phase matcher 624. The output of the logical AND gate 610 is provided along optical channel 628, and provides AND functionality as shown in Table 1.

A phase shifter 629 is provided so that inputs from optical channels 614 and 620 will be mutually out of phase by 180 degrees. Thus, optical switch 612 will open and provide an output signal when light is input along both optical channels 614 and 620 and will be closed and no output signal will be provided when light is only input on one of channels 614 and 620. It is appreciated that no output signal will be provided when there is no light input on either of channels 614 and 620.

Thus, the present invention provides a logical AND gate wherein digital signal lights coming into the first and second data inputs are divided into two channels one of which the wavelength is shortened and the phase is matched to switch activation signals. Additionally, a logical AND gate is provided where in the activation light that is phase matched to the shortened wavelength signal that goes into the optical switch and only opens to let a data signal out of the gate when a data signal is received into both inputs thereby satisfying the requirements of a logical AND gate.

Figure 22:
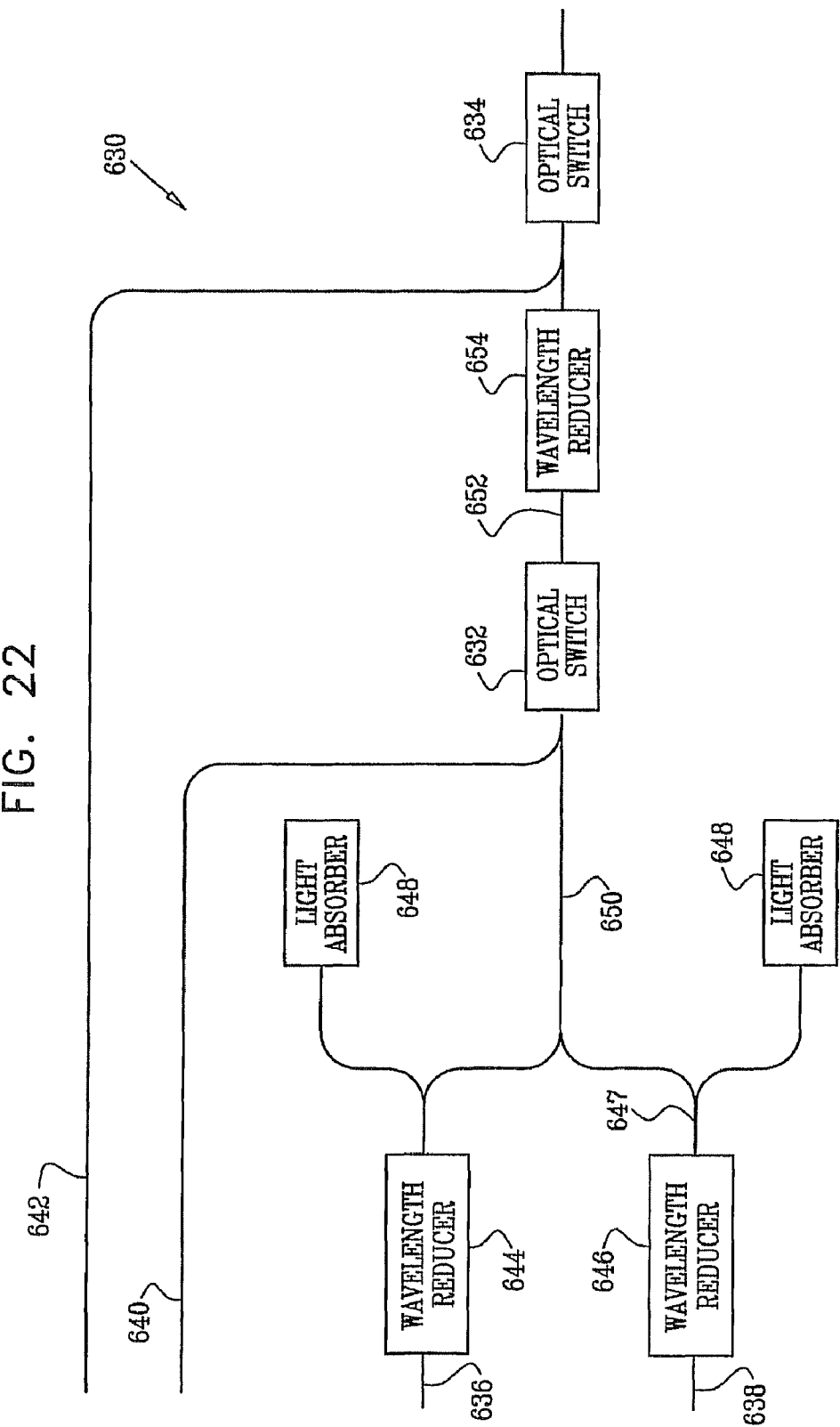
FIG. 22 is a second schematic drawing of a logical AND gate that uses optical switches.

Reference is now made to FIG. 22, which is a schematic illustration of a logical AND gate 630 that uses two light activated optical switches 632 and 634 to handle the digital light signal data. A first logical input signal of 1500 nm light is provided to the logical AND gate 630 along an optical channel 636 and a second logical input signal of 1500 nm light is provided to the logical AND gate 630 along an optical channel 638. A first optical channel 640, such as an optical fiber, supplies an actuation signal of 1500 nm light to optical switch 632 and a second optical channel 642 supplies an actuation signal of 1500 nm light to optical switch 634.

A first and second wavelength reducer 642 and 646 double the frequency of the 1500 nm light so that it becomes 750 nm light. The power is also boosted up to the level needed to activate a light activated optical switch after the frequency is doubled. Optical switches have been designed to activate with an activation light power of 150 milliwatts. One half of the digital light signal output by wavelength reducers 642 and 646 along an optical channel 647 is provided to a light absorber 648 The other half of the light signal output from wavelength reducers 642 and 646 joins with the optical signal input on optical channel 640, which is needed to make the logical AND gate 630 work. Optical switch 632 will allow the 1500 nm signal on optical channel 640 to pass through it until a 750 nm signal strong enough to close it is input to an optical channel 650. This will occur when a 1500 nm signal comes in to the gate on optical channels 636 and 638. An optical channel 652 provides the output signal from switch 632 to a wavelength reducer 654. Wavelength reducer 654 doubles the frequency of the 1500 min signal output by optical switch 632 along optical channel 652.

Optical channel 642 provides a 1500 nm signal into the logical AND gate 630 and joins it with the output of wavelength reducer 654. Optical switch 634 will allow the 1500 nm signal from optical channel 642 to exit the switch as long as no signal is output from optical switch 632 via wavelength reducer 654.

When there is only a signal entering on one of optical channels 636 and 638, the 750 nm signal input into optical switch 632 is not sufficient to make switch 632 close and stop the flow of 1500 nm light from optical channel 640. When a signal is provided on both optical channels 636 and 638, the signal is sufficient to turn off the 1500 nm signal from optical channel 640.

As long as the signal from optical channel 640 is output from switch 632 there will be no signal provided from optical switch 634.

Only when a 1500 nm signal is provided on both optical channels 636 and 638 does the source light from optical channel 640 get turned off by optical switch 632 and only then is the input provided by optical channel 642 output from switch 634, thus providing a logical AND gate, with an output of 1500 nm light only when a 1500 nm signal is provided on both optical channels 636 and 638. This logical AND gate operates as in Table 1.

It is appreciated that the change to half of the wavelength is provided merely as an example. Other wave lengths and means could be used.

Thus, the present invention provides a logical AND gate wherein the wavelength of the two input signals are immediately shortened and divided to provide light for the activation of optical switches. Also provided is a logical AND gate wherein light with the wavelength shortened actuates a switch once a data signal enter both inputs of the gate that sends a data wavelength signal that is supplied to a second optical switch. The wavelength of the output signal is increased to be an actuating signal for second optical switch assuring that a data signal only leaves the logical AND gate when two inputs come into the two data ports of the gate there by satisfying the requirements of an logical AND gate.

Figure 23:
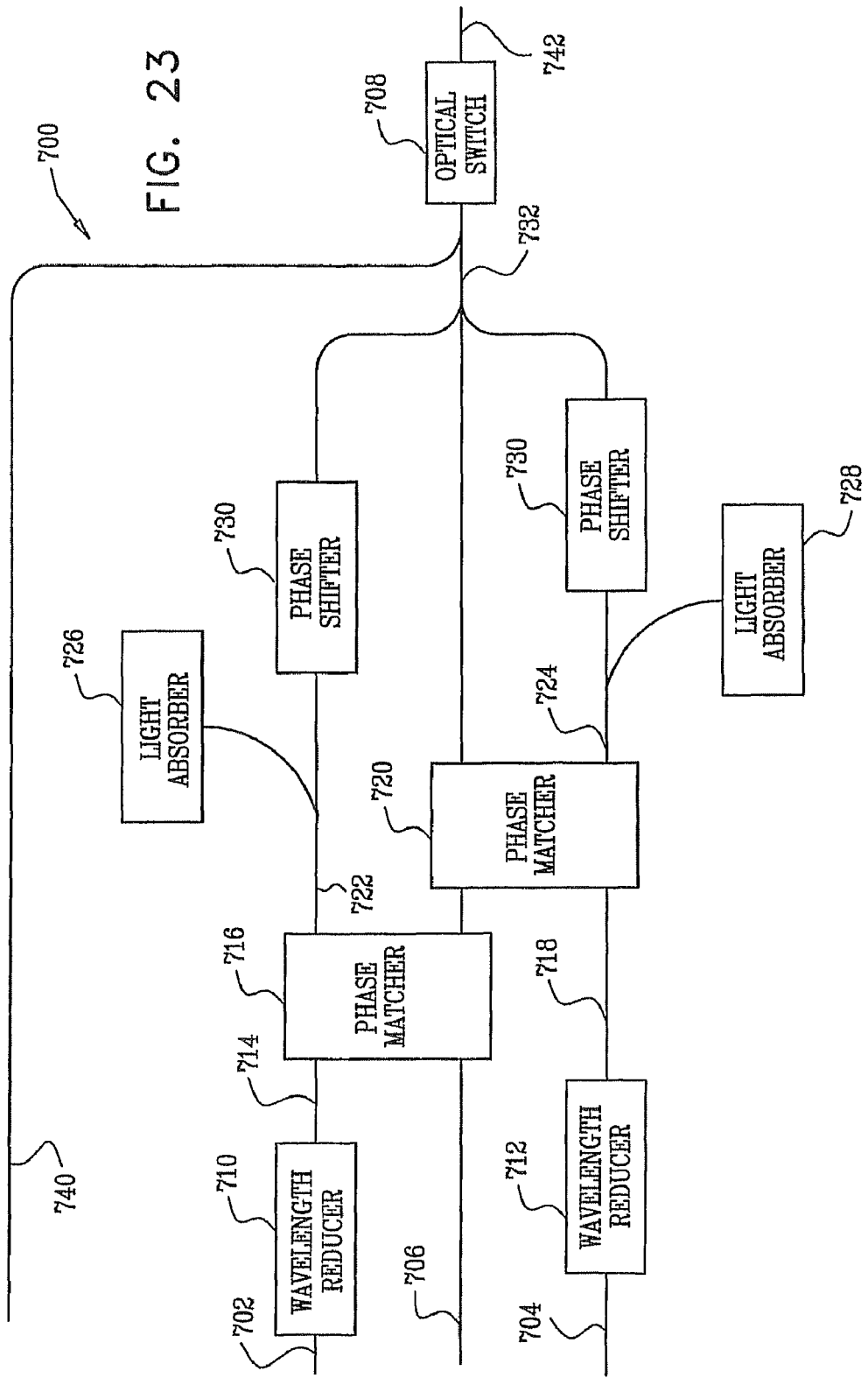
FIG. 23 is a schematic drawing of a logical OR gate that uses optical switches and phase matching devices.

Reference is now made to FIG. 23, which is a schematic illustration of a logical OR gate 700. A first logical input signal of 1500 nm light is provided to the logical OR gate 700 along an optical channel 702 and a second logical input signal of 1500 nm light is provided to the logical AND gate 700 along an optical channel 704. An optical channel 706 provides a source of 750 nm light that feeds an optical switch 708. Optical switch 708 will remain closed and no output 1500 nm signal will be provided unless the 750 nm signal from optical channel 706 is canceled.

A first and second wavelength reducer 710 and 712 double the frequency of the 1500 mm signals provided along optical channels 702 and 704 so they become 750 nm signals. An optical amplifier integrated into the device boosts the power lost in the change of the frequency up again to a useful level.

Optical channel 714 carries the 750 nm signal output from wavelength reducer 710 to a phase matcher 716. The phase matcher 716 makes the phase of the 750 nm signal from along optical channel 714 to be in phase with the source signal of 750 nm light along optical channel 706.

An optical channel 718 provides the output from wavelength reducer 712 to a phase matcher 720. The phase matcher 720 makes the phase of the signal along optical channel 718 to be in phase with the source signal of 750 nm light along optical channel 706.

Optical channels 722 and 724 provide half of the light from the phase matchers 716 and 720, respectively, to light absorbers 726 and 728. Phase shifters 730 are half wave length paths that put the signals from optical channels 702 and 704 180 degrees out of phase with the light along optical channel; 706 that they have been specifically phase matched with. When they mix with the light along optical channel 706 they will cancel half of it out.

An optical channel 732 carries the 750 nm source light from phase matcher 720, and joins it with the signals from phase shifters 730 and an optical channel 740, which is a source of 1500 nm light that will flow out of switch 708 until a signal of sufficient power comes from optical channel 706 to shut it off. The signal is output from switch 708 along an optical channel 742, thus providing a logical OR gate.

As long as the source of 750 nm light from optical channel 706 is fed into switch 708 no signal from source of 1500 nm light from optical channel 740 will be allowed to come out of the logical OR gate, but if a signal comes into either optical channel 702 or 704 then the light from optical channel 706 will be canceled to half power and a 1500 nm signal will be allowed to come out of the logical OR gate.

In addition, if a signal is provided on both optical channels 702 and 704 they will be of sufficient power together to totally cancel the source of 750 nm light from optical channel 706, resulting in an output signal being provided by the logical OR gate 700.

The last paragraph explained how the logical OR gate disclosed herein fulfills the requirements of the logical OR gate truth table seen in Table 2. When a signal is provided along optical channel 702 or 704 or both then a 1500 nm signal comes out of the logical OR gate 700.

By providing a Logical NOT gate, as described in FIG. 20, on the output of a logical OR gate, described in FIG. 23, a logical NOR gate is made, which will function as the truth table shone in Table 3.

Figure 24:
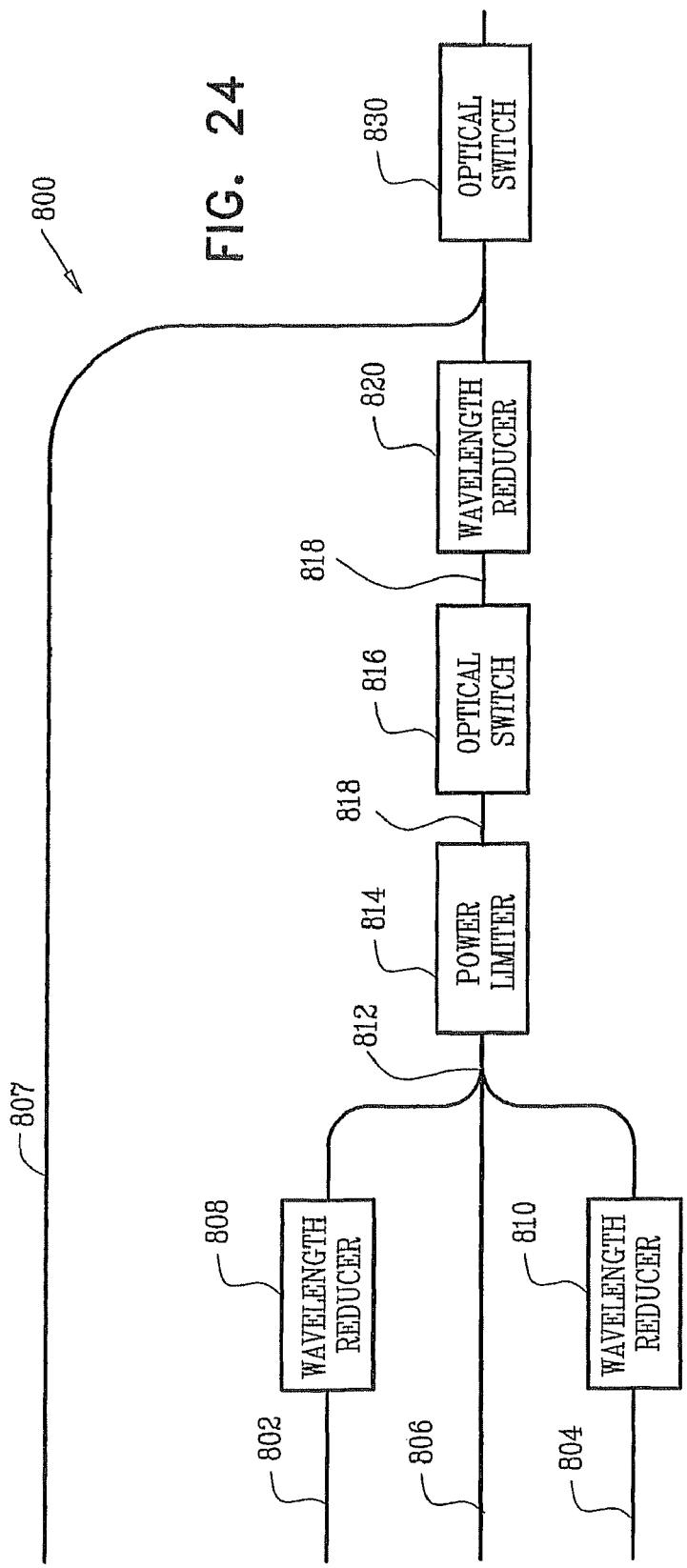
FIG. 24 is a schematic drawing of a logical OR gate that uses optical switches and a power limiter.

Reference is now made to FIG. 24, which is an alternative logical OR gate 800. Lines 802 and 804 are optical channels or fibers that provide the optical digital signals A and B coming into the gate. These are 1500 nm light signals. Lines 806 and 807 are sources of 1500 nm light for the function of the logical OR gate.

Wavelength reducers 808 and 810 are frequency doublers that also boost the power of the light to levels that can activate a light activated optical switch after the frequency is doubled. Line 812 is a network of optical channels or fibers that carry the signals A and B from wavelength reducers 808 and 810 and combine with the signal from line 806 and carry all this into power limiter 814.

Power limiter 814 allows power levels to pass on that are below a certain maximum. Lines numbered 818 are optical channels or fibers that carry signals from power limiter 814 to switch 816 to wavelength reducer 820. Switch 816 is a light activated optical switch. Wavelength reducer 820 doubles the frequency of the signal coming out of switch 816.

Switch 830 is a light activated optical switch. Line 807 is an optical channel or fiber that brings a 1500 nm signal to combine with the output of wavelength reducer 820 and carry it on to switch 830. As long as there is a signal from wavelength reducer 820 no signal will come out of Switch 830.

When a 1500 nm signal enters from Line 802 (the A signal) it is converted to 750 nm light in reducer 808 and passes through power limiter 814 unchanged and turns off the 1500 nm signal from Line 806 in switch 816. So, no signal goes on to turn off the signal from Line 807 and the OR gate sends out a signal. When a signal comes from Line 804 (the B signal) passing through reducer 810 (doubling the frequency), power limiter 814 to switch 816, and no signal from 806 goes on to turn off switch 830. This allows a signal to go from Line 807 out of the gate through switch 830.

If signals come from both Lines 802 and 804, then the double output of the reducers 808 and 810 is limited by limiter 814 to be appropriate for shutting off the signal from line 806 in switch 816. This will allow the signal from Line 807 to exit the logical OR gate. When a signal comes in to A or B or both then a 1500 nm signal comes out of the logical OR gate. This then functions as truth table in Table 2 proscribes, which describes the function of a logical, OR gate.

A logic gate providing OR functionality and wherein the at least one optical switch includes first and second optical switches and wherein the signal light has a wavelength greater than that of the activation light, the logic gate also including first and second logic inputs receiving signal light inputs, a first wavelength modifier operative to decrease the wavelength of the light along the first light input to the wavelength of the activation light; a second wavelength modifier operative to decrease the wavelength of the light along the second light input to the wavelength of the activation light; first and second light conduits supplying wavelength modified light from the first and second wavelength modifiers; a power limiter receiving light from the first wavelength modifier and second wavelength modifier via the respective first and second light conduits and being operative to maintain light output therefrom at a predetermined power level; a third light conduit supplying power limited light from the power limiter to the first optical switch; a third wavelength modifier receiving signal light from the first optical switch and being operative to decrease the wavelength of the light to the wavelength of the activation light; and a fourth light conduit supplying light from the third wavelength modifier to the second optical switch.

Reference is now made to FIG. 25, which is a schematic of a logical OR gate 900. Optical channel 902 provides a first input to the logical gate 900. Optical channel is a fiber optic channel that carries the light signal into the logic gate where it is divided in half. Half of the light is taken to a frequency increasing device numbered 905. From frequency increasing device 905 the light proceeds through a half wave path numbered 906 that makes the light from 905 out of phase with the light it will meet from frequency increasing device 908. The light from the half wave path 906 then combines with the light of the logic gate to inter optical switch 910. The other half of the light from line 902, which is logical input A joins with the other light of the logic gate to enter optical switch 910. Line 904 is input B to the logic gate. Line 904 is a fiber optic channel that carries the light signal into the logic gate where it is divided in half. Half of the light is taken into a frequency increasing device numbered 908. The light from frequency increasing device numbered 908 then combines with the other light in the logic gate to inter the optical switch numbered 910. The other half of the light from line 904 joins with the other light of the logic device to inter optical switch 910. Line 912 is the output of the logical OR device.

A logic gate providing OR functionality and wherein the at least one optical switch includes a single optical switch and wherein the signal light has a wavelength greater than that of the activation light, the logic gate also including first and second logic inputs receiving signal light, a first light conduit receiving a first portion of the signal light received at the first logic input, a second light conduit receiving a second portion of the signal light received at the first logic input, a third light conduit receiving a first portion of the signal light received at the second logic input, a fourth light conduit receiving a second portion of the signal light received at the second logic input, a first wavelength modifier operative to decrease the wavelength of the light along the second light conduit to the wavelength of the activation light, a second wavelength modifier operative to decrease the wavelength of the light along the fourth light conduit to the wavelength of the activation light and a phase shifter operative to cause wavelength modified light from the first wavelength modifier to be out of phase by 180 degrees with respect to the light from the second wavelength modifier, the optical switch receiving light from the first and third light conduits, the second wavelength modifier and the phase shifter.

A logical NOR gate that functions as the truth table in Table 3 shows is made by putting the logical NOT gate of FIG. 20 on the output of the logical OR gate of FIG. 24 or 25. Although some examples of logic gates, which utilize light activated optical switches, are described, other embodiments of AND, OR, NOR and NOT logic gates can be produced using light activated optical switches.

It will be appreciated by persons skilled in the art that the present invention is not limited by what has been particularly shown and described hereinabove. Rather the invention includes both combinations and subcombinations of various features described hereinabove as well as modifications thereof which would occur to persons skilled in the art upon reading the foregoing description and which are not in the prior art.

The invention claimed is:

1. A logic gate comprising at least one gate having at least one of NOT, AND, OR, NAND and NOR functionality comprising at least one optical switch actuated by light, said at least one optical switch comprising:
   a signal light passageway having a changeable cross-sectional area; and
   an activation light responsive piezoelectric element associated with said light passageway, said activation light responsive piezoelectric element being operative to change its shape in response to activation light impinging thereon;
   said activation light responsive piezoelectric element being associated with said light passageway and being operative such that changes in the shape of said piezoelectric element cause changes in said changeable cross-sectional area of said light sufficient to govern the passage of signal light along said light passageway.

2. A logic gate according to claim 1 and also comprising light conduits supplying said activation light to said at least one optical switch and which carry signal light which carries digital information to and from said at least one light switch.

3. A logic gate according to claim 2 and wherein said signal light has a wavelength which is greater than that of said activation light.

4. A logic gate according to claim 2 and wherein said signal light has a wavelength which is approximately twice that of said activation light.

5. A logic gate according to claim 3 and wherein said signal light has a wavelength of 1500 nm, and said activation light has a wavelength of approximately 750 nm.

6. A logic gate according to claim 2, providing NOT functionality and wherein said at least one optical switch comprises a single optical switch and wherein said signal light has a wavelength of approximately twice that of said activation light.

7. A logic gate according to claim 2, providing AND functionality and wherein said at least one optical switch comprises a single optical switch and wherein said signal light has a wavelength greater than that of said activation light, said logic gate also comprising:
   first and second logic inputs receiving signal light;
   a first light conduit receiving a first portion of the signal light received at said first logic input;
   a second light conduit receiving a second portion of the signal light received at said first logic input;
   a third light conduit receiving a first portion of the signal light received at said second logic input;
   a fourth light conduit receiving a second portion of the signal light received at said second logic input;
   a first wavelength modifier operative to decrease the wavelength of the light along said second light conduit to the wavelength of said activation light;
   a second wavelength modifier operative to decrease the wavelength of the light along said fourth light conduit to the wavelength of said activation light;

a first phase matcher operative to match the phase of said light along said second light conduit to that said activation light;

a second phase matcher which matches the phase of said light along said fourth light conduit to said activation light; and a phase shifter operative to cause wavelength reduced and phase matched light along said second and fourth light conduits to be mutually out of phase by 180 degrees, light along said first and third light conduits being supplied as a signal light input to said optical switch; and wavelength reduced and phase matched light along said second and fourth light conduits being supplied together with additional activation light as activation light to said optical switch.

8. A logic gate according to claim 2, providing NAND functionality and wherein said first optical switch comprises a first optical switch and a second optical switch and wherein said signal light has a wavelength greater than that of said activation light, said logic gate also comprising:

first and second logic inputs receiving signal light inputs;

a first wavelength modifier operative to decrease the wavelength of signal light at said first input to the wavelength of said activation light;

a second wavelength modifier operative to decrease the wavelength of signal light at said second input to the wavelength of said activation light;

a third wavelength modifier operative to decrease the wavelength of signal light from said first optical switch;

a first light conduit supplying part of said light from said first wavelength modifier to a first light absorber;

a second light conduit supplying part of said light from said first wavelength modifier to said first optical switch;

a third light conduit supplying part of said light from said second wavelength modifier to a second light absorber;

a fourth light conduit supplying part of said light from said second wavelength modifier to said first optical switch;

a fifth light conduit supplying signal light from said first optical switch to said third wavelength modifier; and a sixth light conduit supplying light wavelength modified light from said third wavelength modifier to said second optical switch as activation light.

9. A logic gate according to claim 2, providing OR functionality and wherein said at least one optical switch comprises a single optical switch and wherein said signal light has a wavelength greater than that of said activation light, said logic gate also comprising:

first and second logic inputs receiving signal light inputs;

a first wavelength modifier operative to decrease the wavelength of the light along said first light input to the wavelength of said activation light;

a second wavelength modifier operative to decrease the wavelength of the light along said second light input to the wavelength of said activation light;

a first phase matcher operative to match the phase of wavelength modified light from the said first wavelength modifier to match the phase of actuation light;

a second phase matcher operative to match the phase of the light from said second wavelength modifier to match the phase of said actuation light;

a first light conduit supplying part of said light from said first phase matcher to a first light absorber;

a second light conduit supplying part of said light from said second phase matcher to a second light absorber;

a first phase shifter;

a second phase shifter;

a third light conduit supplying part of said light from said first phase matcher to said first phase shifter, thereby to cause light from said first phase matcher to be out of phase with said activation light; and a fourth light conduit supplying part of said light from said second phase matcher to a second phase shifter, thereby to cause light from said first phase matcher to be out of phase with said supplied activation light, a fifth light conduit supplying light from said first phase shifter to said optical switch; and a sixth light conduit supplying light from said second phase shifter to said optical switch, said optical switch receiving said activation light and signal light from said fifth and sixth light conduits.

10. A logic gate according to claim 2, providing OR functionality and wherein said at least one optical switch comprises first and second optical switches and wherein said signal light has a wavelength greater than that of said activation light, said logic gate also comprising:

first and second logic inputs receiving signal light inputs;

a first wavelength modifier operative to decrease the wavelength of the light along said first light input to the wavelength of said activation light;

a second wavelength modifier operative to decrease the wavelength of the light along said second light input to the wavelength of said activation light;

first and second light conduits supplying wavelength modified light from said first and second wavelength modifiers;

a power limiter receiving light from said first wavelength modifier and second wavelength modifier via said respective first and second light conduits and being operative to maintain light output therefrom at a predetermined power level;

a third light conduit supplying power limited light from said power limiter to said first optical switch;

a third wavelength modifier receiving signal light from said first optical switch and being operative to decrease the wavelength of the light to the wavelength of said activation light; and a fourth light conduit supplying light from said third wavelength modifier to said second optical switch.

11. A logic gate according to claim 2, providing OR functionality and wherein said at least one optical switch comprises a single optical switch and wherein said signal light has a wavelength greater than that of said activation light, said logic gate also comprising:

first and second logic inputs receiving signal light;

a first light conduit receiving a first portion of the signal light received at said first logic input;

a second light conduit receiving a second portion of the signal light received at said first logic input;

a third light conduit receiving a first portion of the signal light received at said second logic input;

a fourth light conduit receiving a second portion of the signal light received at said second logic input;

a first wavelength modifier operative to decrease the wavelength of the light along said second light conduit to the wavelength of said activation light;

a second wavelength modifier operative to decrease the wavelength of the light along said fourth light conduit to the wavelength of said activation light; and a phase shifter operative to cause wavelength modified light from said first wavelength modifier to be out of phase by 180 degrees with respect to said light from said second wavelength modifier, said optical switch receiving light from said first and third light conduits, said second wavelength modifier and said phase shifter.

* * * * *